(12) United States Patent
Rondinelli et al.

(10) Patent No.: US 7,123,777 B2
(45) Date of Patent: Oct. 17, 2006

(54) SYSTEM AND METHOD FOR PANORAMIC IMAGING

(75) Inventors: Michael Rondinelli, Bethel Park, PA (US); Herman Herman, Pittsburgh, PA (US); Sanjiv Singh, Pittsburgh, PA (US)

(73) Assignee: EyeSee360, Inc., Pittsburgh, PA (US)

( * ) Notice: Subject to any disclaimer, the term of this patent is extended or adjusted under 35 U.S.C. 154(b) by 687 days.

(21) Appl. No.: 10/256,743

(22) Filed: Sep. 26, 2002

(65) Prior Publication Data

US 2003/0068098 A1  Apr. 10, 2003

Related U.S. Application Data

(63) Continuation-in-part of application No. 10/227,136, filed on Aug. 23, 2002, and a continuation-in-part of application No. 10/080,834, filed on Feb. 22, 2002, now Pat. No. 6,856,472, and a continuation-in-part of application No. 10/081,433, filed on Feb. 22, 2002, now abandoned, and a continuation-in-part of application No. 10/081,545, filed on Feb. 22, 2002, now abandoned.

(60) Provisional application No. 60/346,717, filed on Jan. 7, 2002, provisional application No. 60/326,013, filed on Sep. 27, 2001.

(51) Int. Cl.
  *G06K 9/36* (2006.01)
(52) U.S. Cl. ............ 382/284; 359/725; 382/154; 382/276
(58) Field of Classification Search ......... 382/284, 382/276, 167, 274, 294–300; 348/36–39; 359/725–728, 364, 402, 403, 618; 358/516; 345/649, 656, 657
See application file for complete search history.

U.S. PATENT DOCUMENTS

| | | | |
|---|---|---|---|
| 994,935 A | 6/1911 | Kleinschmidt |
| 3,846,809 A | 11/1974 | Pinzone et al. |
| 4,429,957 A | 2/1984 | King |
| 4,549,208 A | 10/1985 | Kamejima et al. |
| 4,734,690 A | 3/1988 | Waller |
| 4,757,383 A | 7/1988 | Tanaka |
| 4,797,944 A | 1/1989 | Tanaka |
| 4,805,030 A | 2/1989 | Tanaka |
| 4,807,042 A | 2/1989 | Tanaka |

(Continued)

FOREIGN PATENT DOCUMENTS

DE  19542355  5/1997

(Continued)

OTHER PUBLICATIONS

R. A. Hicks et al., "Catadioptric Sensors That Approximate Wide-Angle Perspective Projections," Drexel University and National Science Foundation, pp. 1-7.

(Continued)

*Primary Examiner*—Yon J. Couso
(74) *Attorney, Agent, or Firm*—Alan G. Towner, Esq.; Pietragallo, Bosick & Gordon LLP

(57) ABSTRACT

The present invention provides a system for processing panoramic photographic images. The system includes a mirror for reflecting an image of a scene, a mounting assembly for mounting the mirror on an axis, a camera for capturing the image reflected by the mirror, a digital converter device for producing pixel data representative of the captured image, and means for radially linearly mapping the pixel data into a viewable image. The mirror includes a convex reflective surface defined by rotating around the axis: an equi-angular shape or a compensated equi-angular shape. Methods for processing images in accordance with the system are also provided.

31 Claims, 25 Drawing Sheets

U.S. PATENT DOCUMENTS

| | | | |
|---|---|---|---|
| 4,965,753 | A | 10/1990 | Kraemer |
| D312,263 | S | 11/1990 | Charles |
| 5,067,019 | A | 11/1991 | Juday et al. |
| 5,115,266 | A | 5/1992 | Troje |
| 5,175,808 | A | 12/1992 | Sayre |
| 5,185,667 | A | 2/1993 | Zimmermann |
| 5,359,363 | A | 10/1994 | Kuban et al. |
| 5,396,583 | A | 3/1995 | Chen et al. |
| 5,444,478 | A | 8/1995 | Lelong et al. |
| 5,452,413 | A | 9/1995 | Blades |
| 5,574,836 | A | 11/1996 | Broemmelsiek |
| 5,586,231 | A | 12/1996 | Florent et al. |
| 5,594,845 | A | 1/1997 | Florent et al. |
| 5,640,496 | A | 6/1997 | Hardy et al. |
| 5,657,073 | A | 8/1997 | Henley |
| 5,760,826 | A | 6/1998 | Nayar |
| 5,790,181 | A | 8/1998 | Chahl et al. |
| 5,796,426 | A | 8/1998 | Gullichsen et al. |
| RE36,207 | E | 5/1999 | Zimmermann et al. |
| 5,920,376 | A | 7/1999 | Bruckstein et al. |
| 5,963,213 | A | 10/1999 | Guedalia et al. |
| 5,990,941 | A | 11/1999 | Jackson et al. |
| 6,005,611 | A | 12/1999 | Gullichsen et al. |
| 6,043,837 | A | 3/2000 | Driscoll, Jr. et al. |
| 6,118,474 | A | 9/2000 | Nayar |
| 6,157,018 | A | 12/2000 | Ishiguro et al. |
| 6,157,385 | A | 12/2000 | Oxaal |
| 6,175,454 | B1 | 1/2001 | Hoogland et al. |
| 6,204,855 | B1 | 3/2001 | Khaund |
| 6,211,864 | B1 | 4/2001 | Redford |
| 6,219,089 | B1 | 4/2001 | Driscoll, Jr. et al. |
| 6,222,683 | B1 | 4/2001 | Hoogland et al. |
| 6,233,004 | B1 | 5/2001 | Tanaka et al. |
| 6,246,413 | B1 | 6/2001 | Teo |
| 6,256,061 | B1 | 7/2001 | Martin et al. |
| 6,271,855 | B1 | 8/2001 | Shum et al. |
| 6,304,285 | B1 | 10/2001 | Geng |
| 6,313,865 | B1 | 11/2001 | Driscoll, Jr. et al. |
| 6,320,584 | B1 | 11/2001 | Golin et al. |
| 6,323,862 | B1 | 11/2001 | Oxaal |
| 6,331,869 | B1 | 12/2001 | Furlan et al. |
| 6,333,826 | B1 | 12/2001 | Charles |
| 6,337,708 | B1 | 1/2002 | Furlan et al. |
| 6,369,818 | B1 | 4/2002 | Hoffman et al. |
| 6,412,961 | B1 * | 7/2002 | Hicks .................. 359/846 |
| 6,754,614 | B1 * | 6/2004 | Barton et al. ................ 703/2 |
| 2001/0010555 | A1 | 8/2001 | Driscoll, Jr. |
| 2001/0015751 | A1 | 8/2001 | Geng |
| 2002/0006000 | A1 | 1/2002 | Kumata et al. |
| 2002/0041326 | A1 | 4/2002 | Driscoll et al. |
| 2002/0064306 | A1 | 5/2002 | Pilz |

FOREIGN PATENT DOCUMENTS

| | | |
|---|---|---|
| DE | 10000673 | 7/2001 |
| FR | 1234341 | 10/1960 |
| WO | WO 0011512 | 3/2000 |

OTHER PUBLICATIONS

J. S. Chahl et al., "Reflective Surfaces for Panoramic Imaging," *Applied Optics*, vol. 36, No. 31, Nov. 1, 1997, pp. 8275-8285.

M. Ollis et al., "Analysis and Design of Panoramic Stereo Vision Using Equi-Angular Pixel Cameras," The Robotics Institute, Carnegie Mellon University, CMU-RI-TR-99-04, Jan. 1999, pp. 1-43.

* cited by examiner

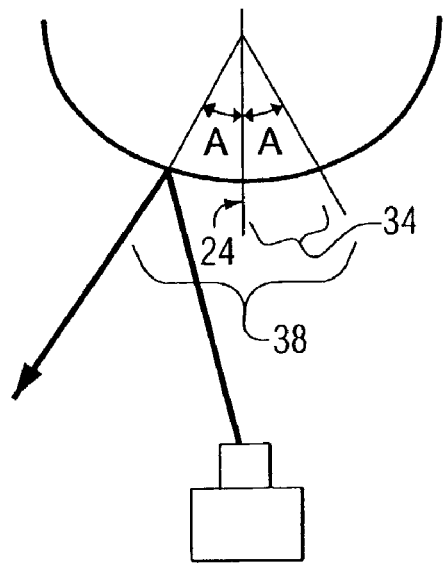
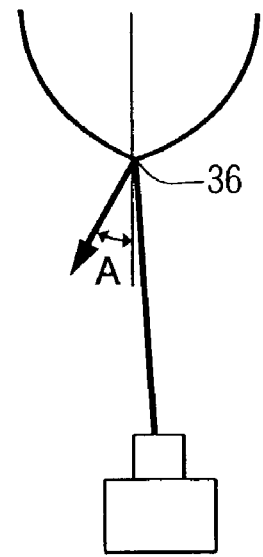
FIG. 8A          FIG. 8B
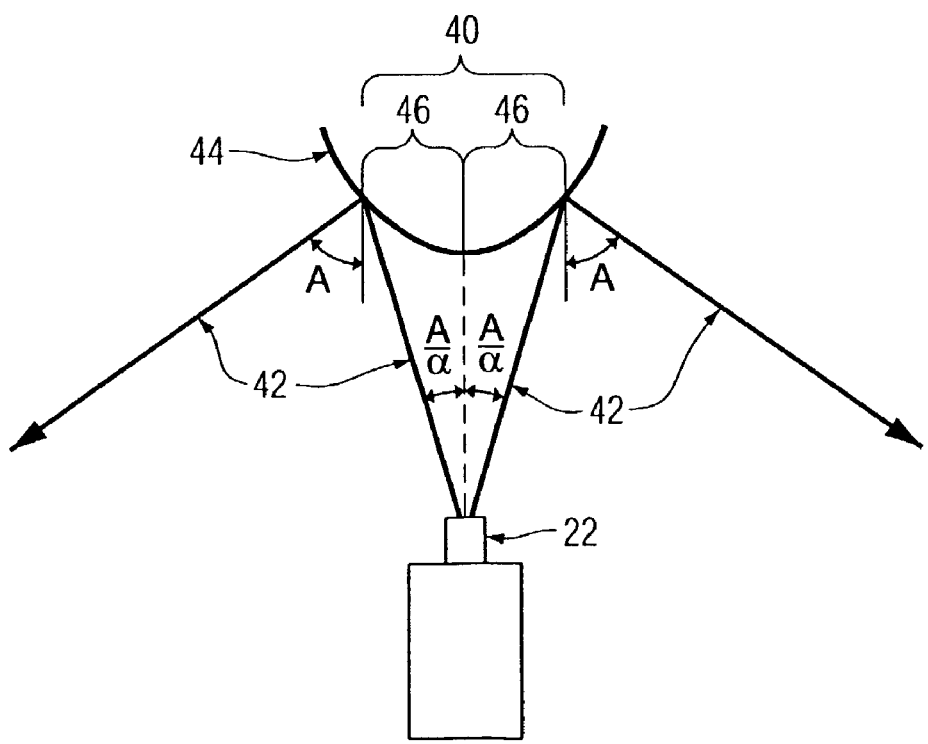
FIG. 9

SYSTEM AND METHOD FOR PANORAMIC IMAGING

CROSS-REFERENCE TO RELATED APPLICATIONS

This application is a continuation-in-part of U.S. patent application Ser. No. 10/080,834 filed Feb. 22, 2002 now U.S. Pat. No. 6,856,472; U.S. patent application Ser. No. 10/081,433 filed Feb. 22, 2002 now abandoned; U.S. patent application Ser. No. 10/081,545 filed Feb. 22, 2002 now abandoned; and U.S. patent application Ser. No. 10/227,136 filed Aug. 23, 2002, which are all incorporated herein by reference. This application also claims the benefit of U.S. Provisional Application Ser. No. 60/326,013 filed Sep. 27, 2001 and U.S. Provisional Application Ser. No. 60/346,717 filed Jan. 7, 2002.

FIELD OF THE INVENTION

The present invention relates to panoramic imaging, and more particularly relates to a system for processing panoramic photographic images.

BACKGROUND INFORMATION

Recent work has shown the benefits of panoramic imaging, which is able to capture a large azimuth view with a significant elevation angle. If instead of providing a small conic section of a view, a camera could capture an entire half-sphere or more at once, several advantages could be realized. Specifically, if the entire environment is visible at the same time, it is not necessary to move the camera to fixate on an object of interest or to perform exploratory camera movements. Additionally, this means that it is not necessary to stitch multiple, individual images together to form a panoramic image. This also means that the same panoramic image or panoramic video can be supplied to multiple viewers, and each viewer can view a different portion of the image or video, independent from the other viewers.

One method for capturing a large field of view in a single image is to use an ultra-wide angle lens. A drawback to this is the fact that a typical 180-degree lens can cause substantial amounts of optical distortion in the resulting image.

A video or still camera placed below a convex reflective surface can provide a large field of view provided an appropriate mirror shape is used. Such a configuration is suited to miniaturization and can be produced relatively inexpensively. Spherical mirrors have been used in such panoramic imaging systems. Spherical mirrors have constant curvatures and are easy to manufacture, but do not provide optimal imaging or resolution.

Hyperboloidal mirrors have been proposed for use in panoramic imaging systems. The rays of light which are reflected off of the hyperboloidal surface, no matter where the point of origin, all converge at a single point, enabling perspective viewing. A major drawback to this system lies in the fact that the rays of light that make up the reflected image converge at the focal point of the reflector. As a result, positioning of the sensor relative to the reflecting surface is critical, and even a slight disturbance of the mirror will impair the quality of the image. Another disadvantage is that the use of a perspective-projections model inherently requires that, as the distance between the sensor and the mirror increases, the cross-section of the mirror must increase. Therefore, in order to keep the mirror at a reasonable size, the mirror must be placed close to the sensor. This causes complications to arise with respect to the design of the image sensor optics.

Another proposed panoramic imaging system uses a parabolic mirror and an orthographic lens for producing perspective images. A disadvantage of this system is that many of the light rays are not orthographically reflected by the parabolic mirror. Therefore, the system requires an orthographic lens to be used with the parabolic mirror.

The use of equi-angular mirrors has been proposed for panoramic imaging systems. Equi-angular mirrors are designed so that each pixel spans an equal angle irrespective of its distance from the center of the image. An equi-angular mirror such as this can provide a resolution superior to the systems discussed above. However, when this system is combined with a camera lens, the combination of the lens and the equi-angular mirror is no longer a projective device, and each pixel does not span exactly the same angle. Therefore, the resolution of the equi-angular mirror is reduced when the mirror is combined with a camera lens.

Ollis, Hernan, and Singh, "Analysis and Design of Panoramic Stereo Vision Using Equi-Angular Pixel Cameras", CMU-RI-TR-99-04, Technical Report, Robotics Institute, Carnegie Mellon University, January 1999, disclose an improved equi-angular mirror that is specifically shaped to account for the perspective effect a camera lens adds when it is combined with such a mirror. This improved equi-angular mirror mounted in front of a camera lens provides a simple system for producing panoramic images that have a very high resolution. However, this system does not take into account the fact that there may be certain areas of the resulting panoramic image that a viewer may have no desire to see. Therefore, some of the superior image resolution resources of the mirror are wasted on non-usable portions of the image.

Panoramic imaging systems also typically require large amounts of computing resources in order to produce viewable panoramic images, especially when displaying the images at an appropriate frequency for video. A single panoramic image may be composed of more than a million pixels. Due to the non-linear mappings of many mirrors and lenses used in existing panoramic imaging systems, and the characteristics of the hardware, software, and/or other computing resources used in conjunction with these mirrors, many of these systems require large amounts of processor resources, processing times, and expert operators in order to produce viewable panoramic images. These problems are particularly apparent when multiple panoramic images are captured and shown sequentially at a frequency rate suitable for video.

The present invention has been developed in view of the foregoing and to address other deficiencies of the prior art.

SUMMARY OF THE INVENTION

The present invention provides a system for processing panoramic photographic images.

An aspect of the present invention is to provide a system for processing images including a mirror for reflecting an image of a scene, a mounting assembly for mounting the mirror on an axis, wherein the mirror includes a convex reflective surface defined by rotating around the axis: an equi-angular shape or a compensated equi-angular shape, a camera for capturing the image reflected by the mirror, a digital converter device for producing pixel data representative of the captured image, and means for radially linearly mapping the pixel data into a viewable image.

Another aspect of the present invention is to provide a system for processing images including a mirror for reflecting an image of a scene, means for mounting the mirror on an axis, wherein the mirror includes a convex reflective surface defined by rotating around the axis: an equi-angular shape or a compensated equi-angular shape, means for capturing the image reflected by the mirror, means for producing pixel data representative of the captured image, and means for radially linearly mapping the pixel data into a viewable image.

A further aspect of the present invention is to provide a method of processing images including the steps of providing a mirror for reflecting an image of a scene, mounting the mirror on an axis, wherein the mirror includes a convex reflective surface defined by rotating around the axis: an equi-angular shape or a compensated equi-angular shape, capturing the image reflected by the mirror, producing pixel data representative of the captured image, and radially linearly mapping the pixel data into a viewable image.

Another aspect of the present invention is to provide a method of processing images including the steps of retrieving a source image including pixel data, creating a first texture map memory buffer, transferring the pixel data from the source image to the first texture map memory buffer, producing a plurality of vertices for a first model of a viewable image, wherein the vertices are representative of one or more points corresponding to one or more space vectors of the source image, computing one or more texture map coordinates for each of the vertices, wherein the one or more texture map coordinates are representative of one or more pieces of pixel data in the first texture map memory buffer corresponding to one or more pieces of pixel data in the source image, transferring the first model, including the vertices and the one or more texture map coordinates, to a graphics hardware device, and instructing the graphics hardware device to use the pixel data to complete the first model and display the completed model as a viewable panoramic image.

A further aspect of the present invention is to provide an apparatus for processing images including means for receiving a source image including pixel data, a processor for creating a texture map memory buffer, for transferring the pixel data from the source image to the texture map memory buffer, for producing a plurality of vertices for a model of a viewable image, wherein the vertices are representative of one or more points corresponding to one or more space vectors of the source image, and for computing one or more texture map coordinates for each of the vertices, wherein the one or more texture map coordinates are representative of one or more pieces of pixel data in the texture map memory buffer corresponding to one or more pieces of pixel data in the source image, and a graphics hardware device for receiving the model, including the vertices and the one or more texture map coordinates, for utilizing the pixel data to complete the model, and for displaying the completed model as a viewable image.

These and other aspects of the present invention will be more apparent from the following description.

BRIEF DESCRIPTION OF THE DRAWINGS

FIG. 8A is a cross sectional image of a convex reflective mirror before an interior part of the two-dimensional mirror profile is removed.

FIG. 8B illustrates how the lower limit of the controlled vertical field of view can be selected by removing an interior part of the mirror profile in accordance with an embodiment of the present invention.

FIG. 9 illustrates how the lower limit of the controlled vertical field of view can be selected by removing an interior part of the mirror profile in accordance with another embodiment of the present invention.

DETAILED DESCRIPTION OF THE INVENTION

Figure 1:
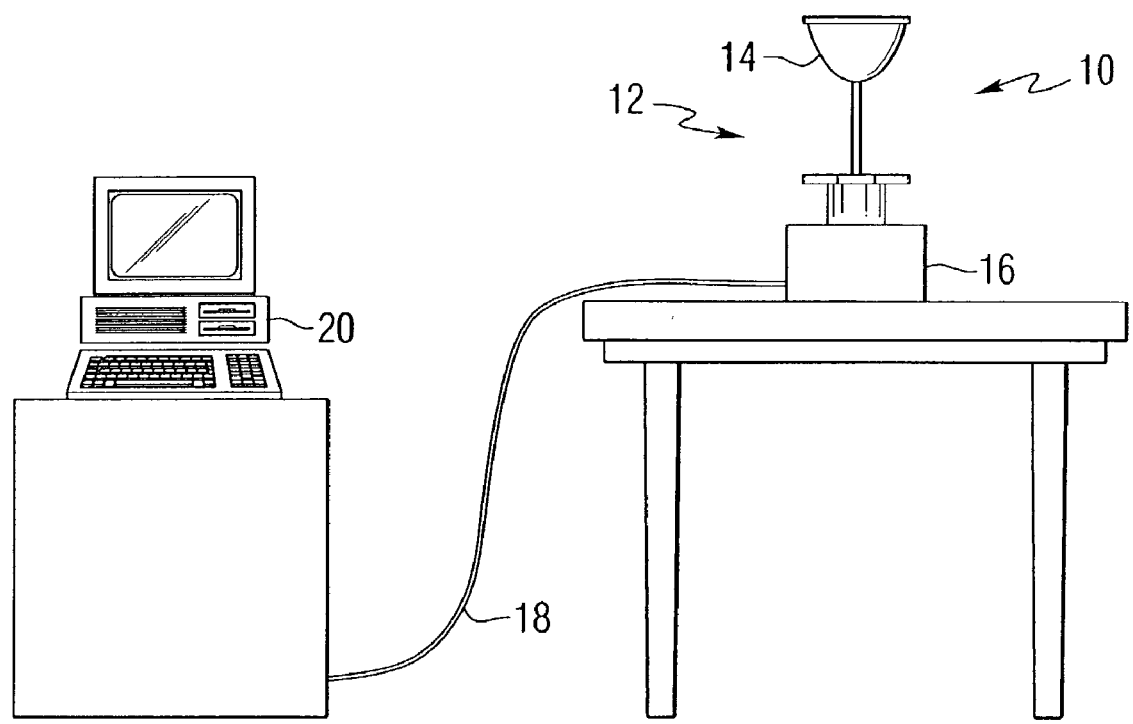
FIG. 1 is a schematic representation of a system for producing panoramic images in accordance with an embodiment of the present invention.

The present invention provides a system for processing panoramic photographic images. Referring to the drawings, FIG. 1 is a schematic representation of a system 10 for producing panoramic images. The system includes a panoramic imaging device 12, which can include a mirror 14 and a camera 16 that cooperate to capture and produce an image in the form of a two-dimensional array of pixels. In one embodiment, a digital converter device, such as a DV or IIDC digital camera connected through an IEEE-1394 bus, may be used to convert the captured image into pixel data. In another embodiment, the camera may be analog, and a digital converter device such as an analog to digital converter may be used to convert the captured image into pixel data. For the purposes of this invention, the pixels are considered to be an abstract data type to allow for the large variety of color models, encodings and bit depths. Each pixel can be represented as a data word, for example a pixel can be a 32-bit value consisting of four 8-bit channels: representing alpha, red, green and blue information. The image data can be transferred, for example by way of a cable 18 or wireless link, to a computer 20 for processing in accordance with this invention. Alternatively, the image data can be transferred over the Internet or other computer network to a computer 20 or other processing means for processing. In one embodiment, the image data may be transferred to a server computer for processing in a client-server computer network, as disclosed in copending commonly owned U.S. patent application Ser. No. 10/081,433 filed Feb. 22, 2002, which is hereby incorporated by reference. Such processing may include, for example, converting the raw 2-dimensional array of pixels captured with the panoramic imaging device into an image suitable for viewing.

As used herein, the term "panoramic images" means wide-angle images taken from a field of view of from about 60° to 360°, typically from about 90° to 360°. Preferably, the panoramic visual images comprise a field of view from about 180° to 360°. In a particular embodiment, the field of view is up to 360° in a principal axis, which is often oriented to provide a 360° horizontal field of view. In this embodiment, a secondary axis may be defined, e.g., a vertical field of view. The vertical field of view may be defined with respect to the optical axis of a camera lens, with the optical axis representing 0°. Such a vertical field of view may range from 0.1° to 180°, for example, from 1° to 160°. In one embodiment, the vertical field of view may be controlled in order to maximize the resolution of the portion of the panoramic image that the viewer is most interested in seeing. In order to maximize the resolution of the portion of the panoramic image that the viewer desires to see, the vertical field of view may be controlled in an attempt to eliminate unwanted portions of the panoramic image from the resulting viewable panoramic image. However, the particular controlled vertical field of view chosen may not fully eliminate unwanted portions of the panoramic image from the viewable panoramic image. For example, in order to provide a panoramic image with improved resolution and minimal unwanted portions of the panoramic image, the controlled vertical field of view may range from about 2° to about 160°, preferably from about 5° to about 150°. A particularly preferred controlled vertical field of view that provides panoramic images with improved resolution and minimal unwanted portions of the panoramic image ranges from about 10° to about 140°.

As used herein, the terms "high-resolution" and/or "improved resolution" mean panoramic images having a viewable resolution of at least 0.3 M pixel, preferably having a viewable resolution of at least at least 0.75 M pixel. In a particular embodiment, the terms "high-resolution" and/or "improved resolution" mean panoramic images having a viewable resolution of at least 1 M pixel.

Figure 2:
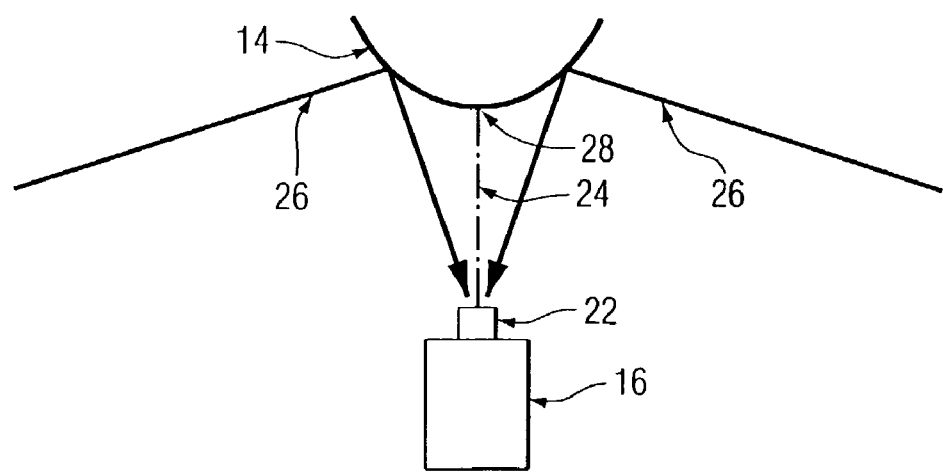
FIG. 2 is a sectional schematic diagram illustrating a camera combined with a convex reflective surface for producing panoramic images in accordance with an embodiment of the present invention.

FIG. 2 is a schematic diagram illustrating a mirror 14 combined with a camera 16, such as the panoramic imaging device 12, for producing panoramic images. Typically the mirror 14 is mounted in front of a camera lens 22 with a suitable mounting device (not shown). The mirror 14 having a central axis 24 gathers light 26 from all directions and redirects it to camera 16. The mirror 14 has a symmetric shape. As used herein, the terms "symmetric" and "symmetrical" mean that the mirror is symmetrical about an axis of rotation. The axis of rotation corresponds to the central axis of the mirror and typically corresponds to the optical axis of the camera used with the mirror. An axial center 28 can be defined, which is at the intersection of the central axis 24 and the surface of the mirror 14.

A panoramic image is typically captured with a system, such as the system 10 of FIG. 1, by mounting the camera on a tripod or holding the camera with the camera pointing up in a vertical direction. For example, when capturing a panoramic image of a room, the camera would normally be oriented with the camera pointing in a vertical direction towards the ceiling of the room. The resulting panoramic image would show the room with the ceiling at the upper portion of the image and the floor at the lower portion of the image. As used herein, the terms "upper" and/or "top", and the terms "lower" and/or "bottom" refer to a panoramic image oriented in the same way. However, it is to be understood that a panoramic image of a room, for example, may also be captured by orienting the camera in a vertical direction towards the floor of the room, and such an orientation is within the present scope of the invention. When using such an orientation, the terms "upper" and/or "top", and the terms "lower" and/or "bottom" would have the reverse orientation and meaning.

Figure 3:
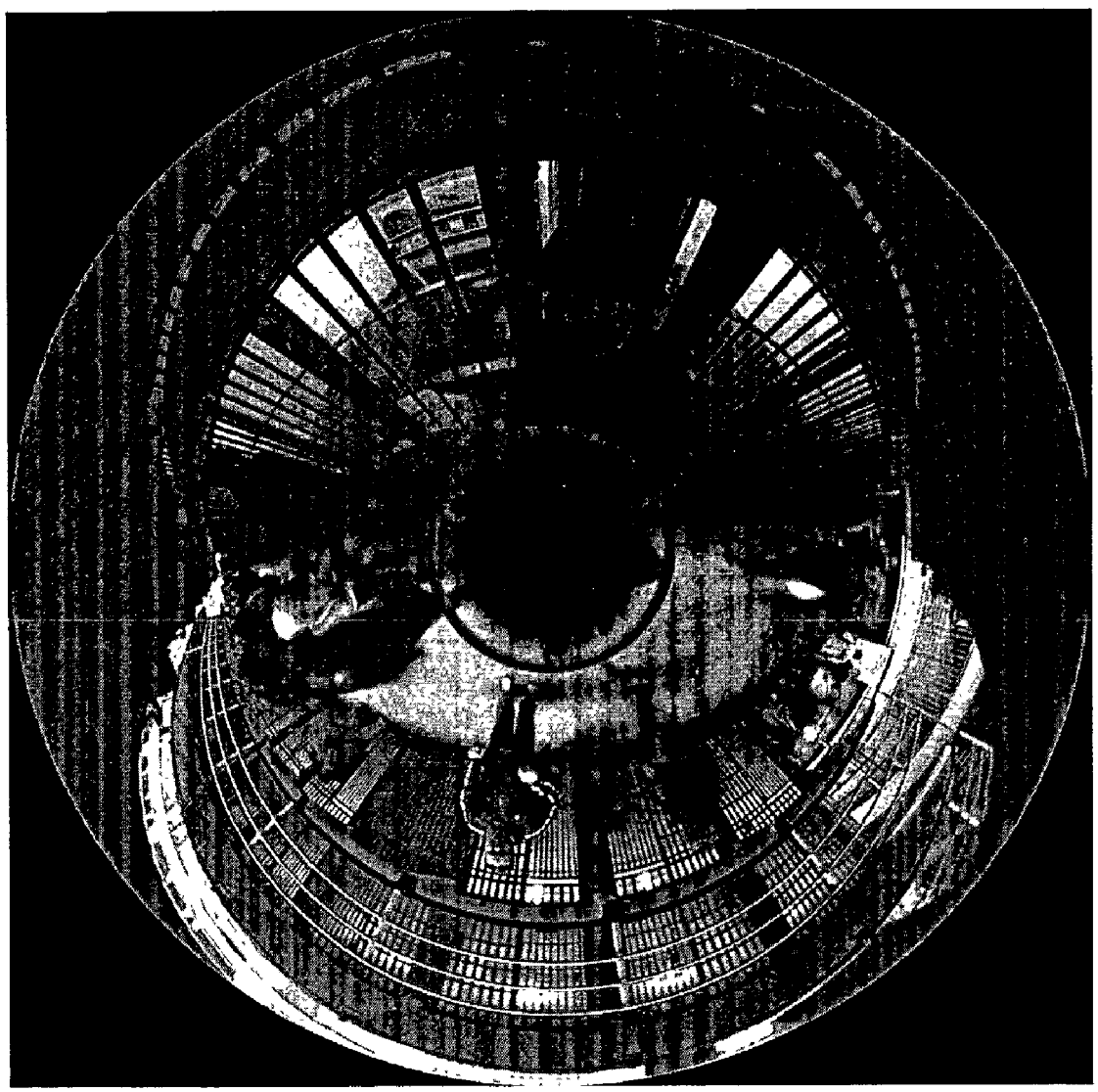
FIG. 3 is a raw 360° image captured with a panoramic camera in accordance with an embodiment of the present invention.
Figure 4:
FIG. 4 is the raw 360° image of FIG. 3 unwarped into a viewable panoramic image in accordance with an embodiment of the present invention.

One common application of such a system is to capture a raw 360° image with the convex reflective surface, and unwarp the raw 360° image into a viewable panoramic image. FIG. 3 shows such a raw 360° image, and FIG. 4 shows the raw 360° image of FIG. 3 unwarped into a viewable panoramic image. As used herein, the term "viewable panoramic image" includes, for example, a panoramic image presented as a rectangular image using a projection onto a cylindrical surface, a panoramic image presented as a six sided cubic, or a panoramic image presented in an equi-rectangular form. However, it is to be understood that panoramic images may be presented in many other desired viewable formats that are known in the art, and these other viewable formats are within the scope of the present invention.

The use of such imagery has distinct advantages. It is a passive sensor, so power requirements are minimal. It has the potential to be extremely robust, since the sensor is purely solid state and has no moving parts. Furthermore, curved mirrors can be made free of optical distortion that is typically seen in lenses. In addition, the large field of view available offers substantial advantages for panoramic photography, target tracking, obstacle detection, localization, and tele-navigation of machinery.

In the system 10 of FIG. 1, the camera 16 can image a full 360 degrees in azimuth and approach 180 degrees in elevation with an appropriately shaped mirror. Unfortunately, obtaining such a large horizontal and vertical field of view comes at the cost of resolution. This is because a fixed amount of pixels are being spread over a large field of view. For example, if a 3 M pixel camera is used with a standard 30×40 degree camera lens, the resulting picture will have a relatively high pixel density. However, if the same 3 M pixel camera is used with a panoramic mirror to capture a panoramic image, the same amount of pixels will now be spread over a field of view as large as 360×180 degrees. In order for the system 10 of FIG. 1 to be beneficial, a panoramic mirror must be used that produces a panoramic image with a high resolution. Furthermore, since the amount of available resolution from a panoramic mirror is limited, it is very important to ensure that only a minimal amount, if any, of this resolution is utilized on portions of the panoramic image that are of least interest to the viewer.

For example, in the system 10 of FIG. 1, if a panoramic image is captured with a 180° vertical field of view, a viewer will typically be most interested in the portion of the panoramic image that is off to the sides of the mirror, possibly from about 40° to about 140°, and will typically be least interested in the portion of the panoramic image that appears closer to the bottom of the panoramic image, from about 0° to 40°, or the portion of the image that appears closer to the top of the panoramic image, from about 140° to 180°. Unfortunately, these least desirable portions of the panoramic image are still captured by the panoramic mirror and will appear in the resulting viewable panoramic image. Thus, the available resolution of the panoramic mirror is wasted on these least desired portions of the panoramic image.

An embodiment of the present invention provides a high-resolution panoramic mirror designed with a controlled vertical field of view. As used herein, the term "controlled vertical field of view" refers to a vertical field of view that is adjusted in order to minimize unwanted images from being captured by the panoramic mirror and thereby appearing in the viewable panoramic image, and to maximize the resolution of the portion of the viewable panoramic image that the user desires to see. The controlled vertical field of view may range from about 2° to about 170°, preferably from about 5° to about 150°. A particularly preferred controlled vertical field of view that provides panoramic images with improved resolution and minimal unwanted portions of the panoramic image ranges from about 10° to about 140°. In this embodiment, the high-resolution qualities of the mirror provide resulting high-resolution panoramic images, while the controlled vertical field of view further increases the resolution of the resulting viewable panoramic image.

In a preferred embodiment, a mirror shape may be used that is truly equi-angular when combined with camera optics. In such an equi-angular mirror/camera system, each pixel in the image spans an equal angle irrespective of its distance from the center of the image, and the shape of the mirror is modified in order to compensate for the perspective effect a camera lens adds when combined with the mirror, thereby providing improved high-resolution panoramic images.

Figure 5:
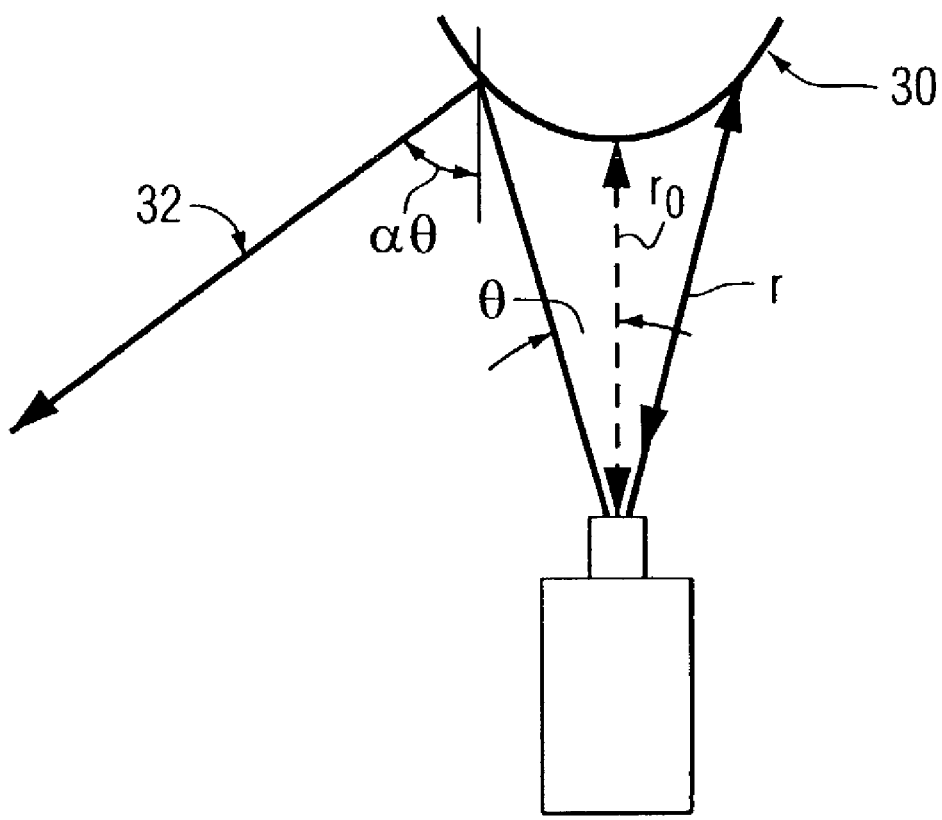
FIG. 5 is the geometry of an equi-angular mirror.

FIG. 5 shows the geometry of such an equi-angular mirror 30. The reflected ray 32 is magnified by a constant gain of α, irrespective of location along the vertical profile. The general form of these mirrors is given in equation (1):

$$\cos\left(\theta \frac{1+\alpha}{2}\right) = (r/r_0)^{-(1+\alpha)/2} \tag{1}$$

For different values of α, mirrors can be produced with a high degree of curvature or a low degree of curvature, while still maintaining their equi-angular properties. In one embodiment, α ranges from about 3 to about 15, preferably from about 5 to about 12. In a particular embodiment, α is chosen to be 11.

Figure 6:
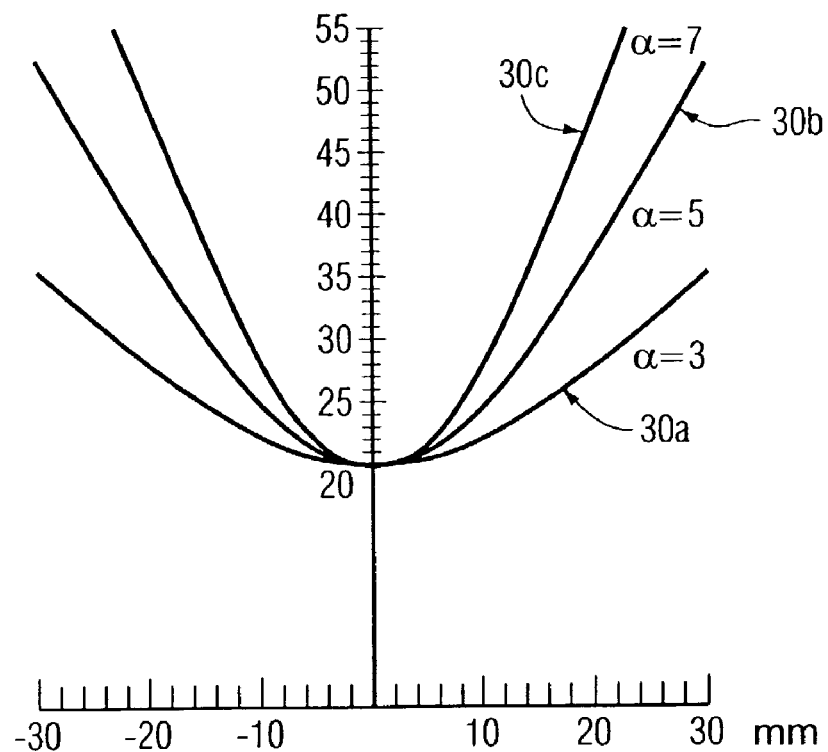
FIG. 6 is equiangular mirror profiles for a gain $\alpha$ of 3, 5, and 7.

FIG. 6 shows mirror profiles 30a, 30b, and 30c with curvatures corresponding to α=3, 5, and 7, respectively. One advantage of these mirrors is that the resolution is unchanged when the camera is pitched or yawed.

It has been determined that the addition of a camera with a lens introduces an effect such that each pixel does not span the same angle. This is because the combination of the mirror and the camera is no longer a projective device. Hence, to be exactly equi-angular, the mirror may be shaped to account for the perspective effect of the lens and the algorithms must be modified. Such a modified equi-angular mirror shape is defined herein as a "compensated equi-angular mirror."

It is possible to make a small angle approximation by assuming that each pixel spans an equal angle. The following equation (2) can be used to derive the mirror shape:

$$\frac{dr}{d\theta} = r\cot\left(k\theta + \frac{\pi}{2}\right) \tag{2}$$

$$k = (-1-\alpha)/2$$

Since the camera is still a projective device this typically only works for small fields of view. Surfaces of mirrors in which each pixel truly corresponds to an equal angle are shapes that satisfy the polar coordinate equation (3) below:

$$\frac{dr}{d\theta} = r\cot\left(k\tan\theta + \frac{\pi}{2}\right) \tag{3}$$

The advantage of using equation (2) is that the surfaces produced have a closed-form solution, whereas equation (3)

must be solved numerically. However, the result of solving equation (3) numerically is that it produces a profile of the mirror that produces a truly equi-angular relation where each pixel in the image has the same vertical field of view.

Figure 7:
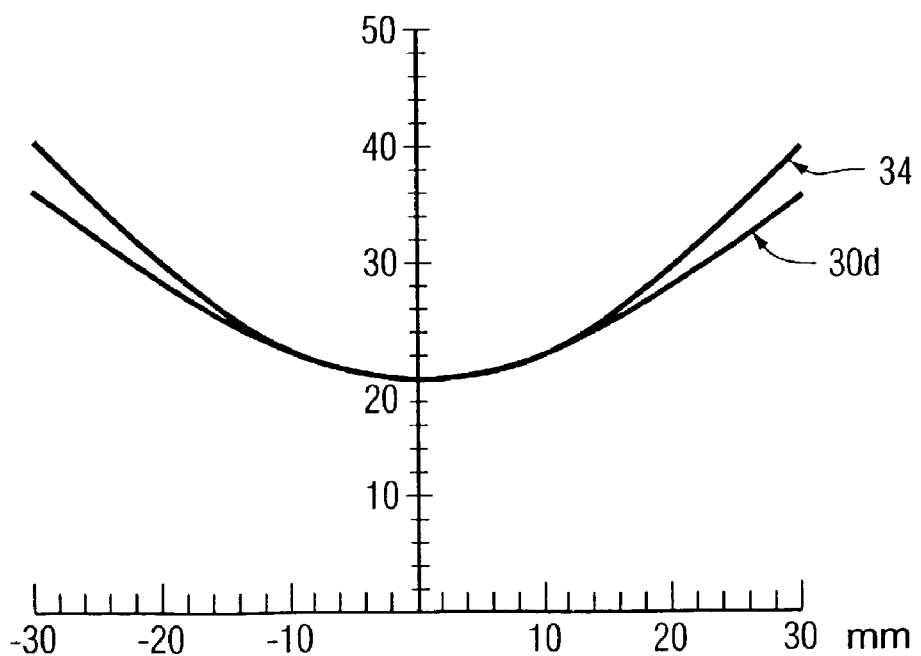
FIG. 7 is an equi-angular mirror that provides approximately equal angles for each pixel and a compensated equi-angular mirror that provides exactly equal angles for each pixel when $\alpha$ is equal to 3.

FIG. 7 shows the difference in the mirror shapes. For α equal to 3, an equi-angular mirror 30d that provides approximately equal angles for each pixel and a compensated equi-angular mirror 34 that provides truly equal angles for each pixel is shown.

A typical convex mirror will typically have a continuous surface across any diameter. Because of this constraint, a significant portion of the imaged surface area of the mirror is likely to reflect portions of a panoramic image that the viewer is least interested in seeing. The pixels in the resulting photograph that reflect such unwanted portions of the panoramic image end up not being efficiently utilized. It is desirable to minimize these unwanted portions of the panoramic image. This is especially important when resolution is at a premium, as is the case with panoramic mirrors.

In one embodiment, a panoramic mirror is fabricated with a controlled vertical field of view. By fabricating a mirror with such a controlled vertical field of view, less desired portions of the panoramic image can be substantially reduced or eliminated from the resulting panoramic image. A compensated equi-angular mirror is most suited to be used in this embodiment. This is because the uniform distribution of resolution along any radius of the mirror provides the most effective elimination of less desired portions of the panoramic image, in addition to producing high-resolution panoramic images.

In one embodiment, in order to select the lower limit of the controlled vertical field of view, a convex shaped panoramic mirror, such as a compensated equi-angular panoramic mirror, can be fabricated into a point at the center of the mirror. As an illustration, a two-dimensional profile of such a mirror can be depicted by removing a conical portion from the center of the two-dimensional mirror profile and constricting the resulting two-dimensional mirror profile at the center to form a point. This constricted shape is illustrated in the sectional views shown in FIGS. 8A and 8B. A cross sectional image of the profile as shown in FIG. 8A may be modified by "trimming" an equal amount of surface 34 on either side of the central axis 24. The two separated segments can then be brought together, forming a point 36, as shown in FIG. 8B. The entire portion of the surface to be removed 38 corresponds to the angle 2A and is shown in FIG. 8A. This is the portion of the mirror that would normally reflect portions of the panoramic image towards the bottom of the surrounding scene that the viewer is most likely not interested in viewing. As an example, angle A ranges from about 2° to about 45°, preferably from about 5° to about 30°. In a particular embodiment, angle A is about 10°.

As another illustration, shown in FIG. 9, the unwanted portion of the mirror 40 to be removed may be determined by tracing a light ray 42 as it reflects from the camera lens 22 to a mirror 44, and then from the mirror 44 at the desired angle A, corresponding to the lower limit of the controlled vertical field of view. If the light ray 42 reflects from the mirror 44 at a desired angle A, then the light ray 42 will reflect from the camera lens 22 to the mirror 44 at an angle A/α, with α being the gain of the mirror. The portions of the mirror 46 that are encompassed by the angle A/α on either side of the central axis of the mirror comprise the unwanted portion 40 of the mirror to be removed.

Figure 10:
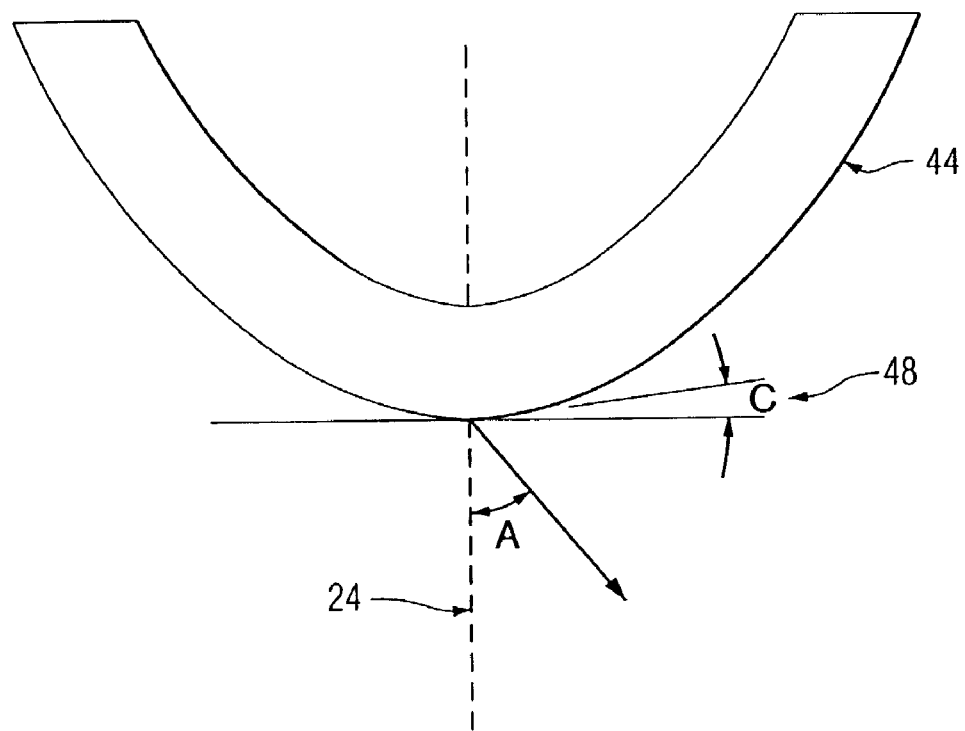
FIG. 10 shows how an angle C can be formed with respect to a first plane perpendicular to a central axis at a point of intersection between the central axis and a mirror, in accordance with an embodiment of the present invention.

Once a two-dimensional mirror profile is developed, as shown in FIG. 8B, an angle C can be formed, shown in FIG. 10 as 48, with respect to a first plane perpendicular to the central axis 24 at a point of intersection between the central axis and the mirror 44. This angle C is dependant upon angle A, which defines the lower limit of the controlled vertical field of view. Equation (4) shows the relationship between angle C and angle A as:

$$C = A/2 \tag{4}$$

In one embodiment, Angle C ranges from about 0.5° to about 20°, preferably from about 1° to about 10°, more preferably from about 2° to about 8°. In a particular embodiment, angle C is about 5°.

For a compensated equi-angular panoramic mirror manufactured with a total cone angle of 2A removed from the center of the mirror, the relationship that describes the resulting mirror profile can now be written in equation (5) as:

$$\frac{dr}{d\left(\theta + \frac{A}{\alpha}\right)} = r\cot\left(k\tan\left(\theta + \frac{A}{\alpha}\right) + \frac{\pi}{2}\right) \tag{5}$$

As is the case with equation (3), equation (5) must also be solved numerically based on various values substituted for θ. θ is the angle that a light ray makes with the central axis as it reflects off of a point on the surface of the mirror and into the camera lens.

Figure 11:
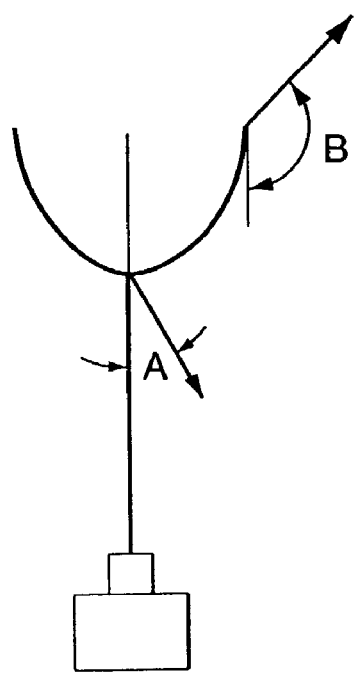
FIG. 11 shows how the upper limit of the controlled vertical field of view can be selected in accordance with an embodiment of the present invention.

In another embodiment, the upper limit of the controlled vertical field of view can be denoted by angle B, shown in FIG. 11. Angle B may be selected by changing the bounds used to numerically solve equation (5). Referring to equation (5), dr/d(θ+(A/α)) can be evaluated at a range of points by integrating between θ=A/α and θ=B/α. This would result in a mirror shape with an upper limit to the controlled vertical field of view, angle B, as desired. As an example, angle B ranges from about 95° to about 180°, preferably from about 120° to about 170°. In a particular embodiment, angle B is about 140°.

Figure 12:
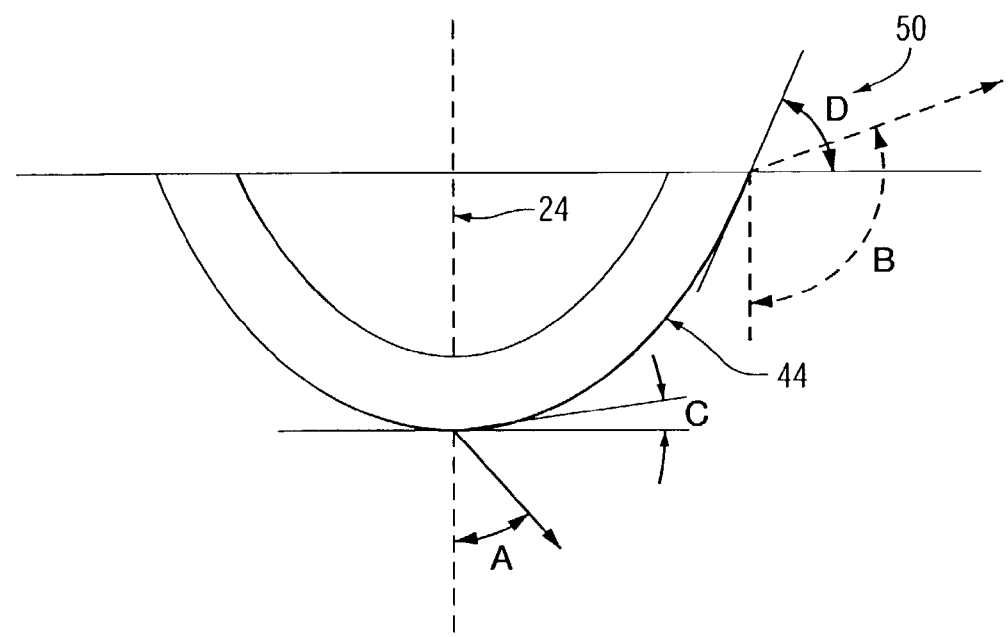
FIG. 12 shows how an angle D can be formed with respect to a second plane perpendicular to the central axis at an end of the mirror opposite the point of intersection between the central axis and the mirror.

Once a two-dimensional mirror profile is developed with an angle B chosen, as shown in FIG. 11, an angle D can be formed, shown in FIG. 12 as 50, with respect to a second plane perpendicular to the central axis 24 at an end of the mirror 44 opposite the point of intersection between the central axis and the mirror. This angle D is dependant upon angle A, which defines the lower limit of the controlled vertical field of view, and angle B, which defines the upper limit of the controlled vertical field of view. Equation (6) shows the relationship between angle D, angle A, and angle B as:

$$D = \frac{((B-A)/\alpha + B)}{2} \tag{6}$$

Angle D ranges from about 50° to about 100°, preferably from about 65° to about 90°, more preferably from about 70° to about 85°. In a particular embodiment, angle D is about 76°.

In practice, a panoramic mirror with a controlled vertical field of view may be formed by generating a two-dimensional profile of such a mirror with the selected angle A, as depicted in FIG. 8B, choosing an appropriate value for B, a shown in FIG. 11, and then rotating the resulting two-dimensional profile around the axis of rotation to form a surface of revolution.

In an embodiment of the invention, A is chosen to be 10°, B is chosen to be 140°, and α is chosen to be 11. Substituting these values in equation (5), and solving the equation numerically, a unique mirror shape is produced with an angle C of about 5° and an angle D of about 76°. This unique mirror shape reflects panoramic images with a resolution unparalleled in the prior art. This superior resolution is obtained from a combination of the compensated equi-angular properties of the panoramic mirror, and the fact that the resolution has been further optimized by controlling the appropriate vertical field of view for the mirror. In this embodiment, the primary concern is providing a high-resolution viewable panoramic image, not eliminating central obscurations from the viewable panoramic image.

Figure 13:
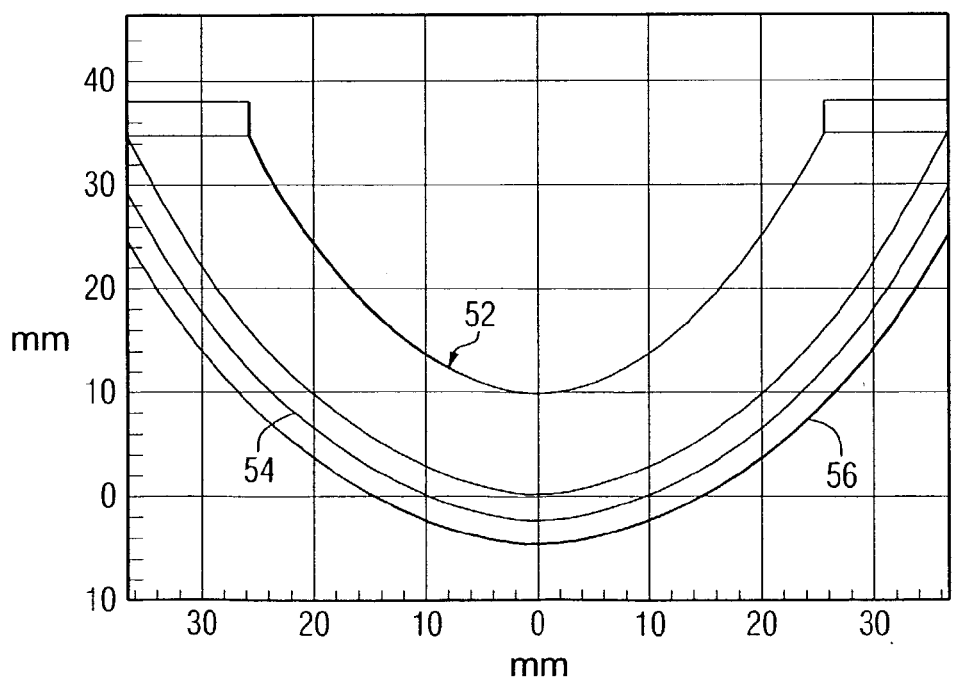
FIG. 13 is a cross-sectional view of a compensated equi-angular mirror with a controlled vertical field of view in accordance with an embodiment of the present invention.

FIG. 13 shows a cross-sectional view of the resulting mirror shape. In a preferred embodiment, the panoramic mirror comprises a substrate 52 made of PYREX glass coated with a reflective surface 54 made of aluminum, and with a silicon protective coating 56. In this embodiment, the smoothness of the mirror is ¼ of the wavelength of visible light.

In one embodiment, in order to provide the portion of the viewable panoramic image that the user is most interested in seeing at the best resolution possible, all of the unwanted portions of the viewable panoramic image may not be fully eliminated. These unwanted portions may include, for example, the camera, the camera mount, the camera lens, the mount holding the mirror in front of the camera and other unwanted foreground images. For example, the vertical field of view of the viewable panoramic image that the viewer wishes to see may be 40° to 140°, while the controlled vertical field of view of the viewable panoramic image may be 10° to 140°. As used herein the term "desired vertical field of view" means the vertical field of view corresponding to the portion of the viewable panoramic image that the viewer is interested in viewing. The desired vertical field of view may be equal to or less than the controlled vertical field of view. The desired vertical field of view may range from about 2° to about 170°, preferably from about 15° to about 150°. A particularly preferred desired vertical field of view that a viewer would typically be interested in viewing ranges from about 40° to about 140°.

In one embodiment, a compensated equi-angular mirror with a controlled vertical field of view may be manufactured with a hole centered at the axial center 28 of the mirror in order to accommodate various mounting devices. The mounting hole may range in diameter from about 0.05 cm to about 15 cm, preferably from about 0.1 cm to about 5 cm. In a particular embodiment the mounting hole is 0.64 cm in diameter.

Figure 14:
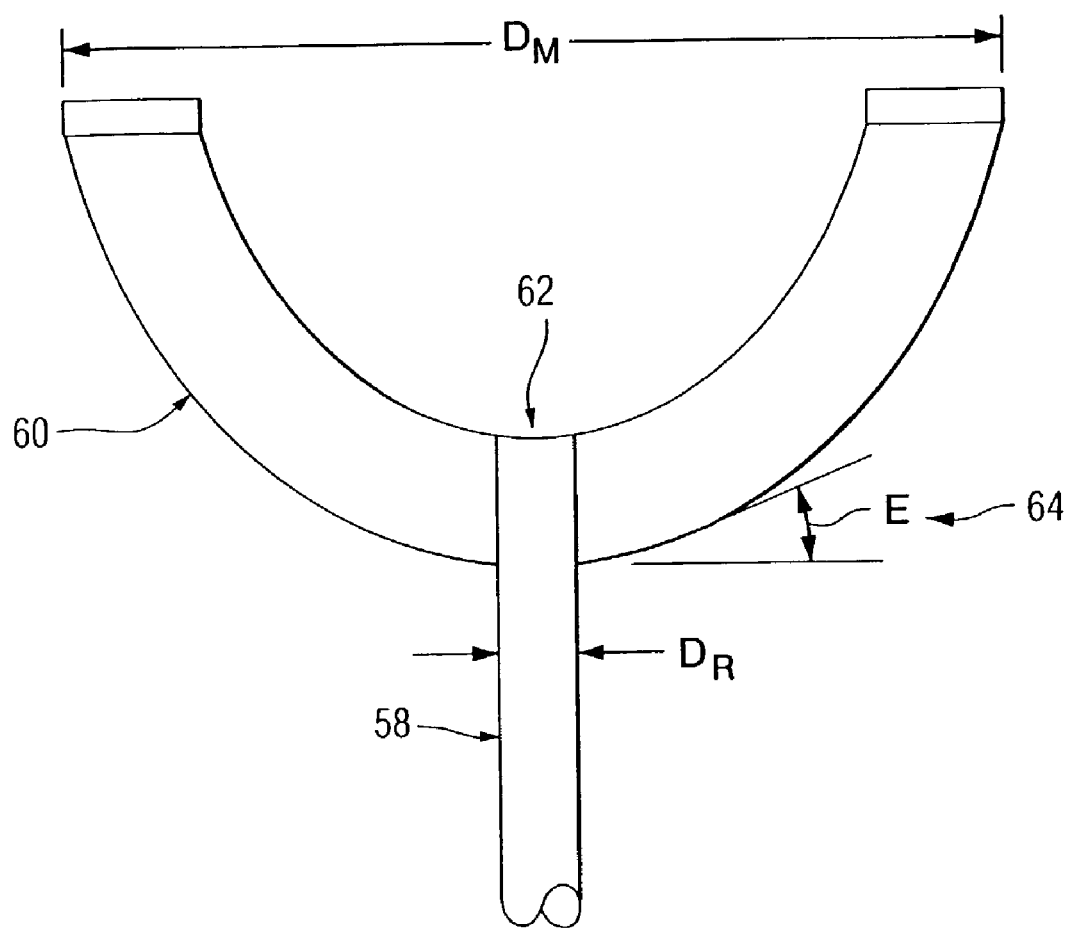
FIG. 14 illustrates a means for mounting a panoramic mirror in front of a camera in accordance with an embodiment of the present invention.

In one embodiment, as shown schematically in FIG. 14, a panoramic mirror with a profile substantially described by equation (4) can be fitted with a mounting assembly, such as a rod 58, to accommodate mounting a mirror 60 in front of a camera (not shown). The shape of the rod may be substantially cylindrical. The mirror 60 can be produced with a hole 62 at the axial center of the mirror in order to accommodate the rod 58. The mounting hole may range in diameter from about 0.05 cm to about 15 cm, preferably from about 0.1 cm to about 5 cm. In a particular embodiment the mounting hole is 0.64 cm in diameter. The rod 58 may range in diameter $D_R$ from about 0.05 cm to about 15 cm, preferably from about 0.1 cm to about 5 cm. In a particular embodiment the rod is 0.64 cm in diameter. The rod 58 may be of various lengths. For example, the rod 58 may range in length from about 3 cm to about 12 cm, preferably from about 4 cm to about 11 cm. In a particular embodiment the rod is about 10.8 cm in length. In this embodiment, the diameter $D_M$ of the mirror 60 may range from about 0.3 cm to about 60 cm, preferably from about 0.5 cm to about 20 cm. In a particular embodiment the diameter of the mirror is 7.94 cm in diameter. In this embodiment, a ratio of the diameter of the rod 58 to the diameter of the mirror 60 may be defined as $D_R:D_M$. $D_R:D_M$ may range from about 1:4, preferably from about 1:5. In a particular embodiment, $D_R:D_M$ is 1:12.5. In this embodiment, an angle E 64 may be formed with respect to a first plane perpendicular to the central axis of the mirror at a point of intersection between the rod and the mirror. Angle E is dependant upon angle A, which defines the lower limit of the controlled vertical field of view. Equation (7) shows the relationship between angle E and angle A as:

$$E=(\operatorname{atan}(r_R/r_{camera})+\alpha\cdot\operatorname{atan}(r_R/r_{camera})+A)/2 \qquad (7)$$

In equation (7), $r_R$ is the radius of the rod. Angle E ranges from about 5° to about 30°, preferably from about 10° to about 20°, more preferably from about 12° to about 16°. In a particular embodiment, angle E is about 14°.

Figure 15:
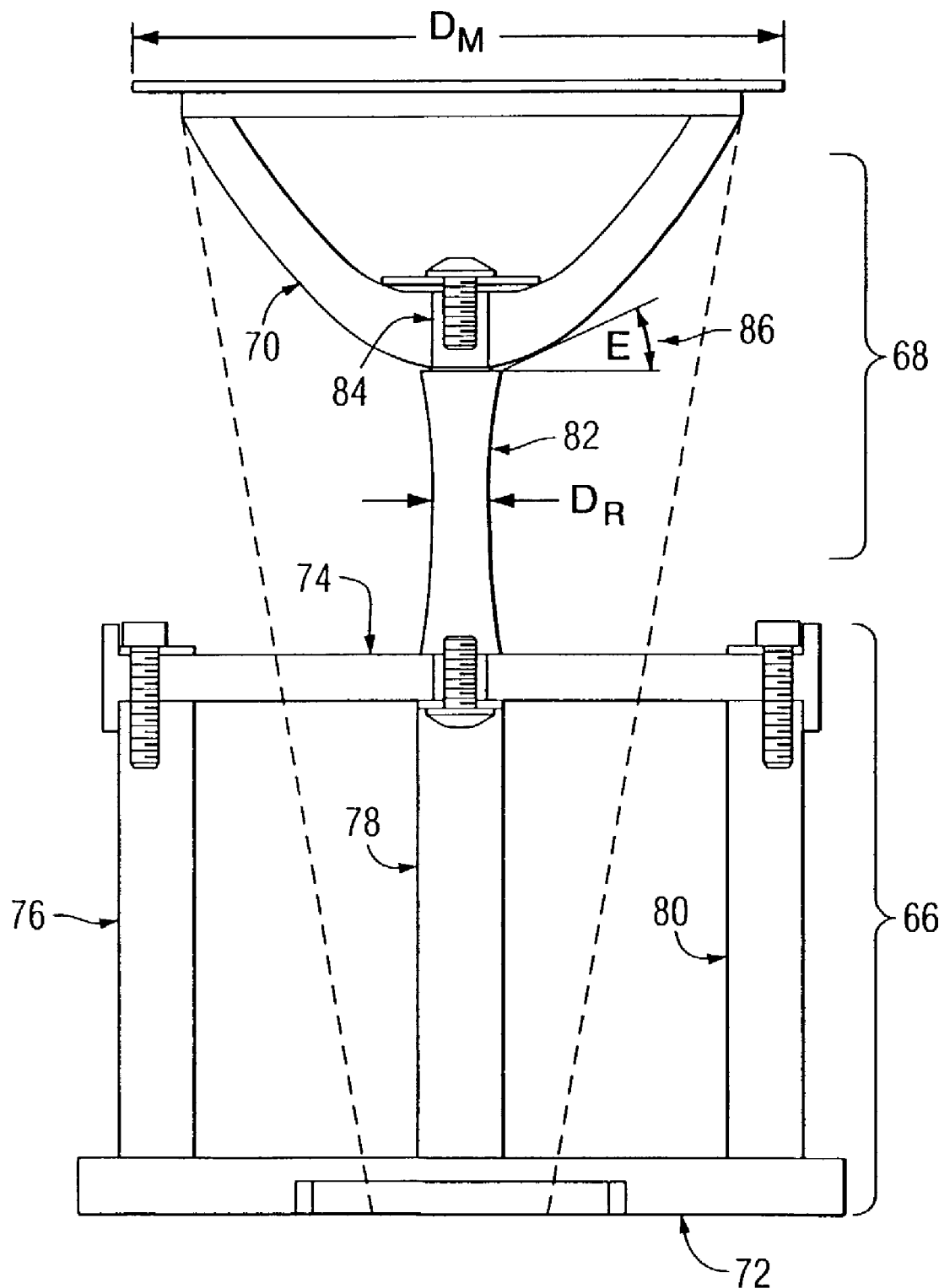
FIG. 15 shows an alternate means for mounting a panoramic mirror in front of a camera in accordance with an embodiment of the present invention.

In another embodiment, a compensated equi-angular mirror with a controlled vertical field of view can be mounted in front of a camera with a mounting assembly as schematically illustrated in FIG. 15. This mounting assembly comprises a primary stage 66 which attaches directly to a camera (not shown), and a secondary stage 68 which is affixed to the primary stage and supports a mirror 70 in front of a camera. The primary stage 66 comprises a first disc 72 and a second disc 74 with a first vertical member 76, a second vertical member 78 and a third vertical member 80 placed between the two discs as shown in FIG. 15. The first disc 72 and the second disc 74 may range in diameter from about 3 cm to about 12 cm, preferably from about 5 cm to about 12 cm. In a particular embodiment the diameter of the first disc or the second disc may be about 8 cm. In this embodiment, the length of the first, second and third vertical members may range in length from about 1 cm to about 8 cm, preferably from about 2 cm to about 7 cm. In a particular embodiment the first vertical member, second vertical member and third vertical member is each about 5.9 cm in length. In this embodiment, the length of the primary stage may range in length from about 1 cm to about 8 cm, preferably from about 2 cm to about 7 cm. In a particular embodiment the primary stage is about 6.5 cm in length. In one embodiment, the secondary stage 68 may comprise a rod 82 with one end of the rod attached to the second disc 74 of the primary stage 66 and the other end of the rod supporting the mirror 70 in front of a camera. The shape of the rod may be substantially cylindrical. In this embodiment, the mirror 70 may be produced with a hole 84 at the axial center of the mirror in order to accommodate the rod. The mounting hole may range in diameter from about 0.05 cm to about 15 cm, preferably from about 0.15 cm to about 5 cm. In a particular embodiment the mounting hole is 0.64 cm in diameter. The rod 82 may range, along the length thereof, in diameter $D_R$ from about 0.05 cm to about 15 cm, preferably from about 0.15 cm to about 5 cm. In a particular embodiment the rod is 0.64 cm in diameter. The rod 82 may be of various lengths, for example, the rod may range in length from about 2 cm to about 6 cm, preferably from about 3 cm to about 5 cm. In a particular embodiment the rod is about 4.3 cm in length. In this embodiment, the $D_M$ of the mirror may range from about 0.3 cm to about 60 cm, preferably from about 0.6 cm. to about 20 cm. In a particular embodiment the diameter of the mirror is 7.94 cm. in diameter. In this embodiment, a ratio of the diameter of the rod to the diameter of the mirror may be defined as $D_R:D_M$. $D_R$. $D_M$ may range from about 1:4, preferably from about 1:5. In a particular embodiment, $D_R:D_M$ is about 1:12.5. In this embodiment, an angle E 86 may be formed with respect to a first plane perpendicular to the central axis of the mirror at a point of intersection between the rod and the mirror. Angle E is dependant upon angle A, which defines the lower limit of the controlled vertical field of view. Equation (7), above, shows the relationship between angle E and angle A. Angle E ranges from about 5° to about 30°, preferably from about 10° to about 20°, more preferably from about 12° to about 16°. In a particular embodiment, angle E is about 14°.

Figure 16:
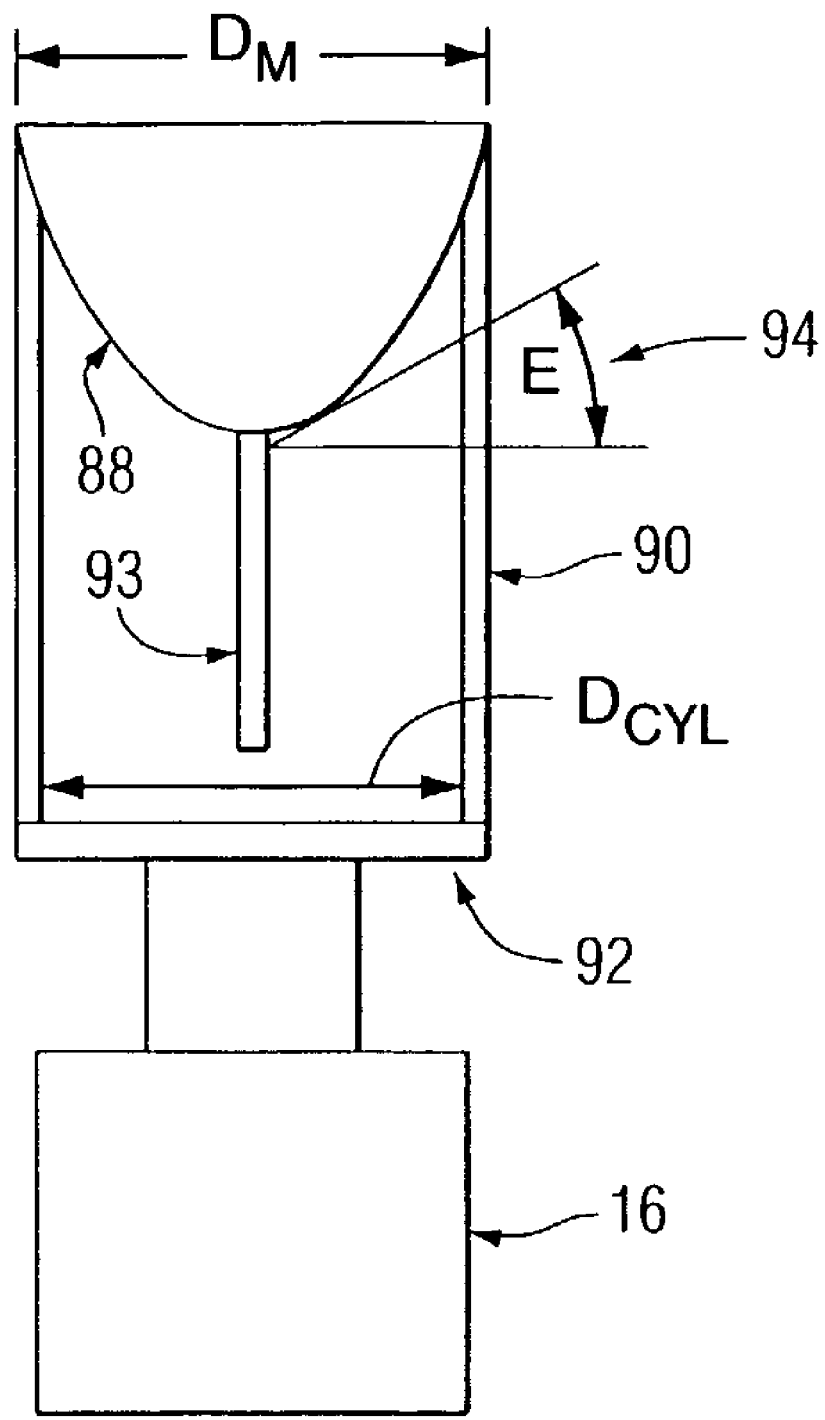
FIG. 16 illustrates an alternate means for mounting a panoramic mirror in front of a camera in accordance with an embodiment of the present invention.

In another embodiment, as shown schematically in FIG. 16, a compensated equi-angular mirror 88 with a controlled vertical field of view may be mounted in front of a camera 16 by using a mounting assembly including a cylinder 90 that attaches to a standard camera lens mount 92. In this embodiment, the diameter $D_{CYL}$ of the cylinder 90 may range from about 0.3 cm to about 60 cm, preferably from about 0.6 cm to about 20 cm. In a particular embodiment the diameter of the cylinder is about 8.5 cm. In this embodiment, the thickness of the cylinder 90 may range from about 0.2 cm to about 0.4 cm, preferably from about 0.25 cm to about 0.35 cm. In a particular embodiment the thickness of the cylinder is about 0.32 cm. The cylinder 90 may be of various lengths, for example, the cylinder 90 may range in length from about 3 cm to about 12 cm, preferably from about 4 cm to about 11 cm. In a particular embodiment the cylinder is about 10.8 cm in length. In this embodiment, the diameter $D_M$ of the mirror 88 may range from about 0.3 cm to about 60 cm, preferably from about 0.6 cm. to about 20 cm. In a particular embodiment the diameter of the mirror is about 7.86 cm. In one embodiment, a rod or needle 93 may be attached to the axial center of the panoramic mirror and may extend downward into the cylinder. This rod or needle serves to reduce reflections in the mirror that may be caused by the cylinder. The rod or needle may be substantially cylindrical in shape. In this embodiment, the length of the rod or needle 92 may range from about 5 cm to about 10 cm, preferably from about 6 cm to about 9 cm. In a particular embodiment the length of the rod or needle is about 8 cm. In this embodiment, the rod or needle 92 may range in diameter from about 0.05 cm to about 15 cm, preferably from about 0.15 cm to about 5 cm. In a particular embodiment the rod or needle is 0.64 cm in diameter. In this embodiment, an angle E 94 may be formed with respect to a first plane perpendicular to the central axis of the mirror at a point of intersection between the rod or needle and the mirror. Angle E is dependant upon angle A, which defines the lower limit of the controlled vertical field of view. Equation (7), above, shows the relationship between angle E and angle A. Angle E ranges from about 5° to about 30°, preferably from about 10° to about 20°, more preferably from about 12° to about 16°. In a particular embodiment, angle E is about 14°.

Figure 17:
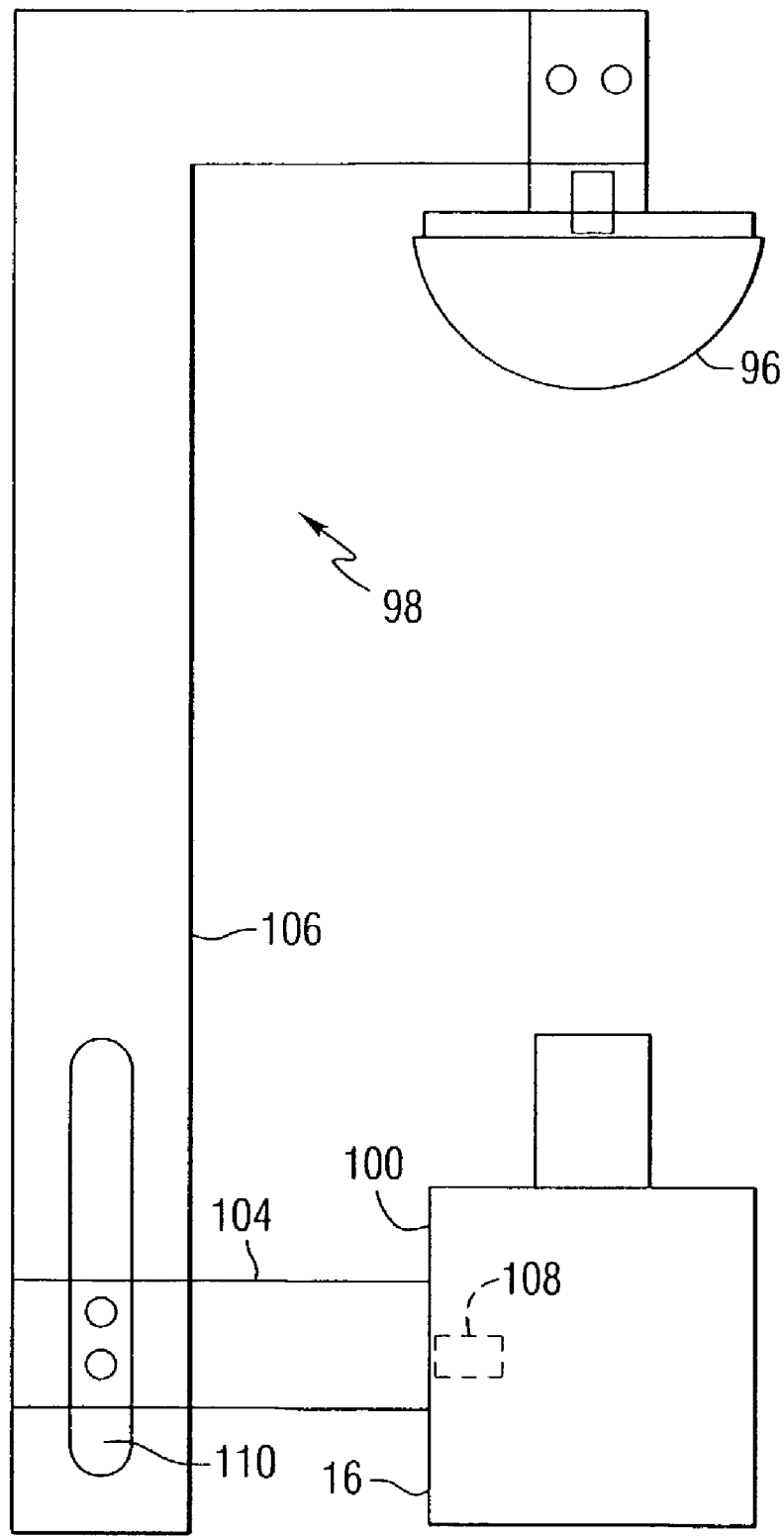
FIG. 17 illustrates an alternate means for mounting a panoramic mirror in front of a camera in accordance with an embodiment of the present invention.

In another embodiment, as shown schematically in FIG. 17, a mirror 96 may be placed in front of the camera 16 with a mounting assembly 98 that physically attaches to a side 100 of the camera 16. A mounting arm is provided which includes a lower horizontal piece 104 and a vertical piece 106. The mount attaches to a side of the camera via a mounting hole 108. A slot 110 is provided at the intersection of the vertical piece of the mount and the lower horizontal piece of the mount, so that the mirror may be moved closer to or farther away from the camera 16. The mount 98 may be constructed from a very thin piece of material. For example, the mount 98 may be constructed from aluminum having a thickness of ⅛ of an inch, however other materials with varying degrees of thickness may be suitable and are within the scope of the present invention.

In a preferred embodiment, a compensated equi-angular mirror with a desired vertical field of view having a lower limit A' of about 40° and an upper limit B' of about 140° is designed with a controlled vertical field of view having an angle A equal to about 10° and an angle B equal to about 140°, an α equal to about 11, and a diameter $D_M$ of about 8 cm. The mirror may be placed at a distance $r_{camera}$ from the camera of about 12 cm, and may placed on a mounting device with a diameter $d_{mount}$ of about 4.25 cm. The mirror is typically placed at a distance $r_{mount}$ from the widest portion of the mirror mount of about 4.7 cm. In this embodiment, the mirror may mounted in front of a camera sold under the designation NIKON 990 by NIKON, or a camera sold under the designation NIKON 995 by NIKON. The mirror may mounted on a rod that is about 0.64 cm thick. In this embodiment, a unique mirror shape is produced with an angle E of about 14° and an angle D of about 76°. In this embodiment, the primary concern is providing a high-resolution viewable panoramic image, not eliminating central obscurations from the viewable panoramic image.

A unique aspect of the present invention is that any video or still camera that will focus on the mirror surface may be used. Since the mirror shape can be designed to account for different distances that the mirror may be placed from a lens of a camera, virtually any video or still camera will work with the system of the present invention.

Once a camera has captured an image of a scene reflected from an attached mirror, this raw image must be converted or "unwarped" into a viewable panoramic image.

In one embodiment, a method and apparatus for processing raw images of a scene reflected by a mirror and captured with a camera may be used with the system of the present invention as disclosed in copending commonly owned U.S. patent application Ser. No. 10/081,545 filed Feb. 22, 2002, which is hereby incorporated by reference. In this embodiment, image processing may be performed using a software application, hereinafter called PhotoWarp, that can be used on various types of computers, such as Mac OS 9, Mac OS X, and Windows platforms. The software can process images captured with a panoramic imaging device, such as the device 12 of FIG. 1, and produce panoramic images suitable for viewing. The resulting panoramas can be produced in several formats, including flat image files (using several projections), QuickTime VR movies (both cylindrical and cubic panorama format), and others.

Figure 18:
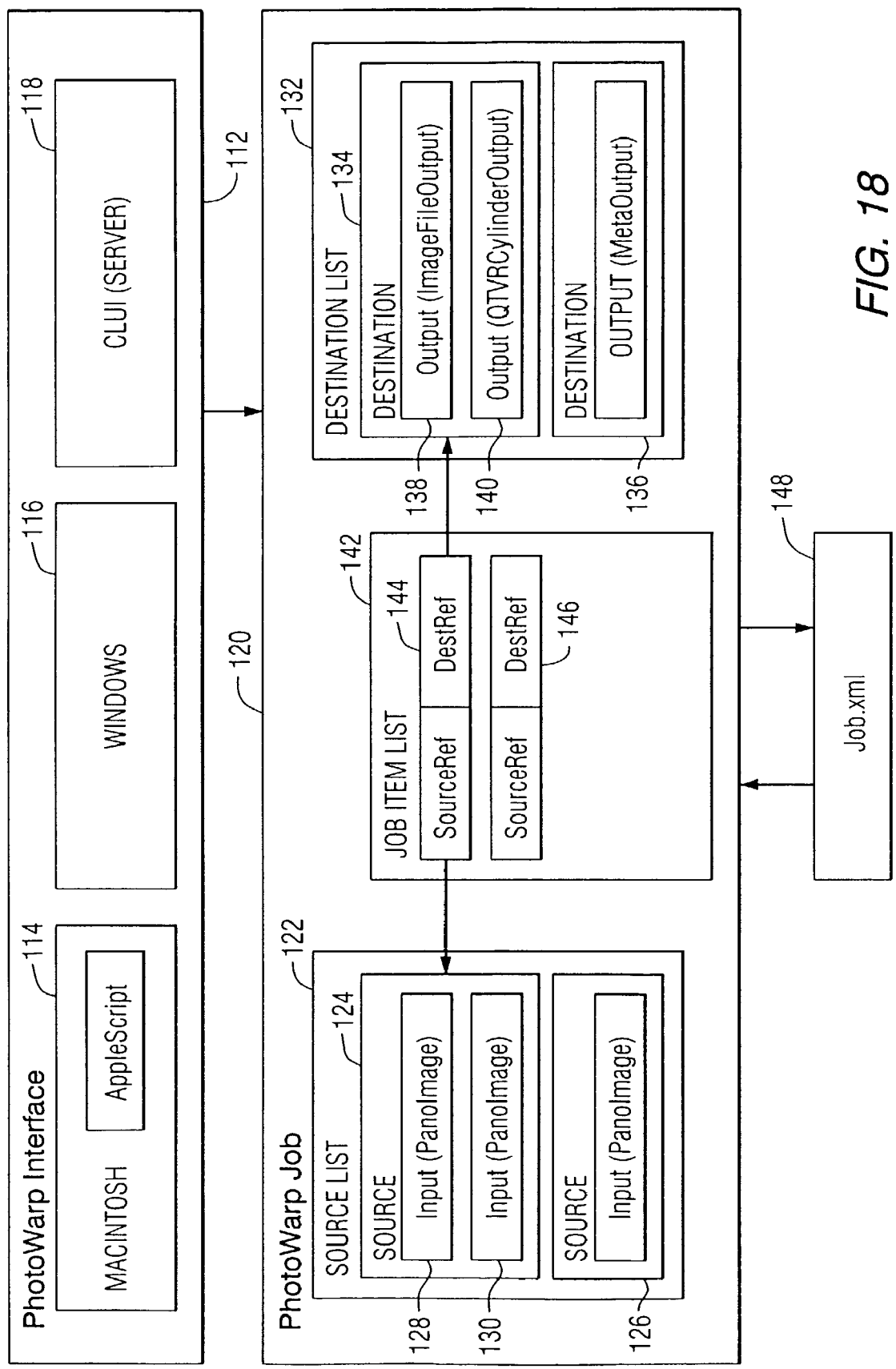
FIG. 18 is a functional block diagram that illustrates the interface and job functions of software that can be used with the system of the invention.

FIG. 18 is a functional block diagram that illustrates the interface and job functions of software that can be used to produce viewable panoramic images. Block 112 shows that the interface can operate in Macintosh 114, Windows 116, and server 118 environments. A user uses the interface to input information to create a Job that reflects the user's preferences concerning the format of the output data. User preferences can be supplied using any of several known techniques including keyboard entries, or more preferably, a graphical user interface that permits the user to select particular parts of a raw image that are to be translated into a form more suitable for viewing.

The PhotoWarp Job 120 contains a source list 122 that identifies one or more source image groups, for example 124 and 126. The source image groups can contain multiple input files as shown in blocks 128 and 130. The PhotoWarp Job 120 also contains a destination list 132 that identifies one or more destination groups 134 and 136. The destination groups can contain multiple output files as shown in blocks 138 and 140. A Job item list 142 identifies the image transformation operations that are to be performed, as illustrated by blocks 144 and 146. The PhotoWarp Job can be converted to XML or alternatively created in XML as shown by block 148.

Figure 19:
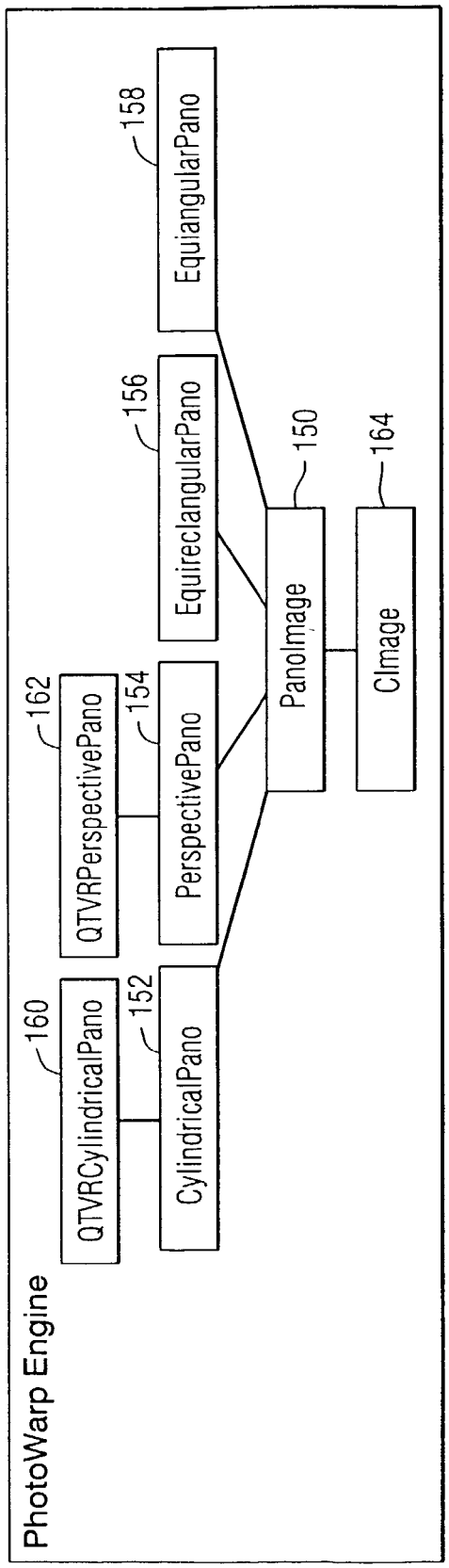
FIG. 19 is a functional block diagram that illustrates the PhotoWarp functions of software that can be used with the system of the invention.

FIG. 19 is a functional block diagram that illustrates several output image options that can be used when practicing the method of the invention. The desired output image is referred to as a PanoImage. The PanoImage 150 can be one of many projections, including Cylindrical Panoramic 152, Perspective Panoramic 154, Equirectangular Panoramic 156, or Equiangular Panoramic 158. The Cylindrical Panoramic projection can be a QTVR Cylindrical Panoramic 160 and the Perspective Panoramic projection can be a QTVR Perspective Panoramic 162. The PanoImage is preferably a CImage class image as shown in block 164. Alternatively, the PanoImage can contain a CImage, but not itself be a CImage.

Figure 20:
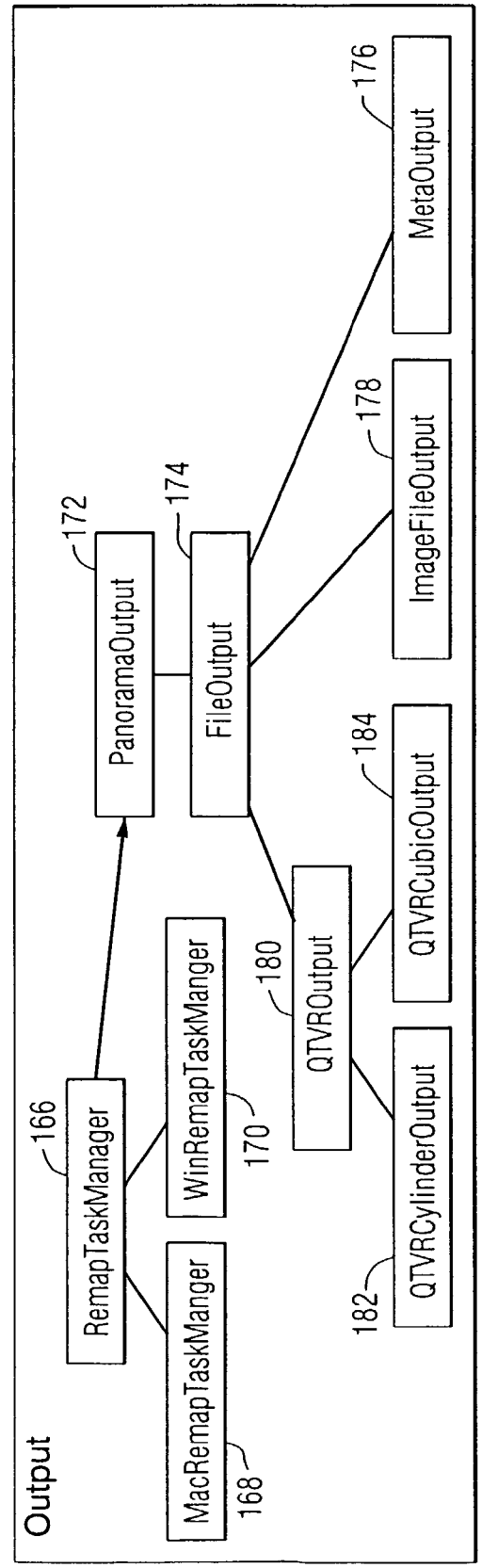
FIG. 20 is a functional block diagram that illustrates the output functions of software that can be used with the system of the invention.

FIG. 20 is a functional block diagram that illustrates the output functions that can be used in producing a viewable panoramic image. A Remap Task Manager 166, which can be operated in a Macintosh or Windows environment as shown by blocks 168 and 170 controls the panorama output in block 172. The panorama output is subsequently converted to a file output 174 that can be in one of several formats, for example MetaOutput 176, Image File Output 178 or QTVR Output 180. Blocks 182 and 184 show that the QTVR Output can be a QTVR Cylindrical Output or a QTVR Cubic Output.

The preferred embodiment of the software includes a PhotoWarp Core that serves as a cross-platform "engine" which drives the functionality of PhotoWarp. The PhotoWarp Core handles all the processing tasks of PhotoWarp, including the reprojection or "unwarping" process that is central to the application's function.

PhotoWarp preferably uses a layered structure that maximizes code reuse, cross-platform functionality and expandability. The preferred embodiment of the software is written in the C and C++ languages, and uses many object-oriented methodologies. The main layers of the application are the interface, jobs, a remapping engine, and output tasks.

The PhotoWarp Core refers to the combination of the Remapping Engine, Output Tasks, and the Job Processor that together do the work of the application. The interface allows users to access this functionality.

The Remapping Engine, or simply the "Engine" is an object-oriented construct designed to perform arbitrary transformations between well-defined geometric projections. The Engine was designed to be platform independent, conforming to the ANSI C++ specification and using only C and C++ standard library functions. The Engine's basic construct is an image object, represented as an object of the CImage class. An image is simply a two-dimensional array of pixels. Pixels are considered to be an abstract data type to allow for the large variety of color models, encodings and bit depths. In one example, a Pixel is a 32-bit value consisting of four 8-bit channels: alpha, red, green and blue.

Figure 21:
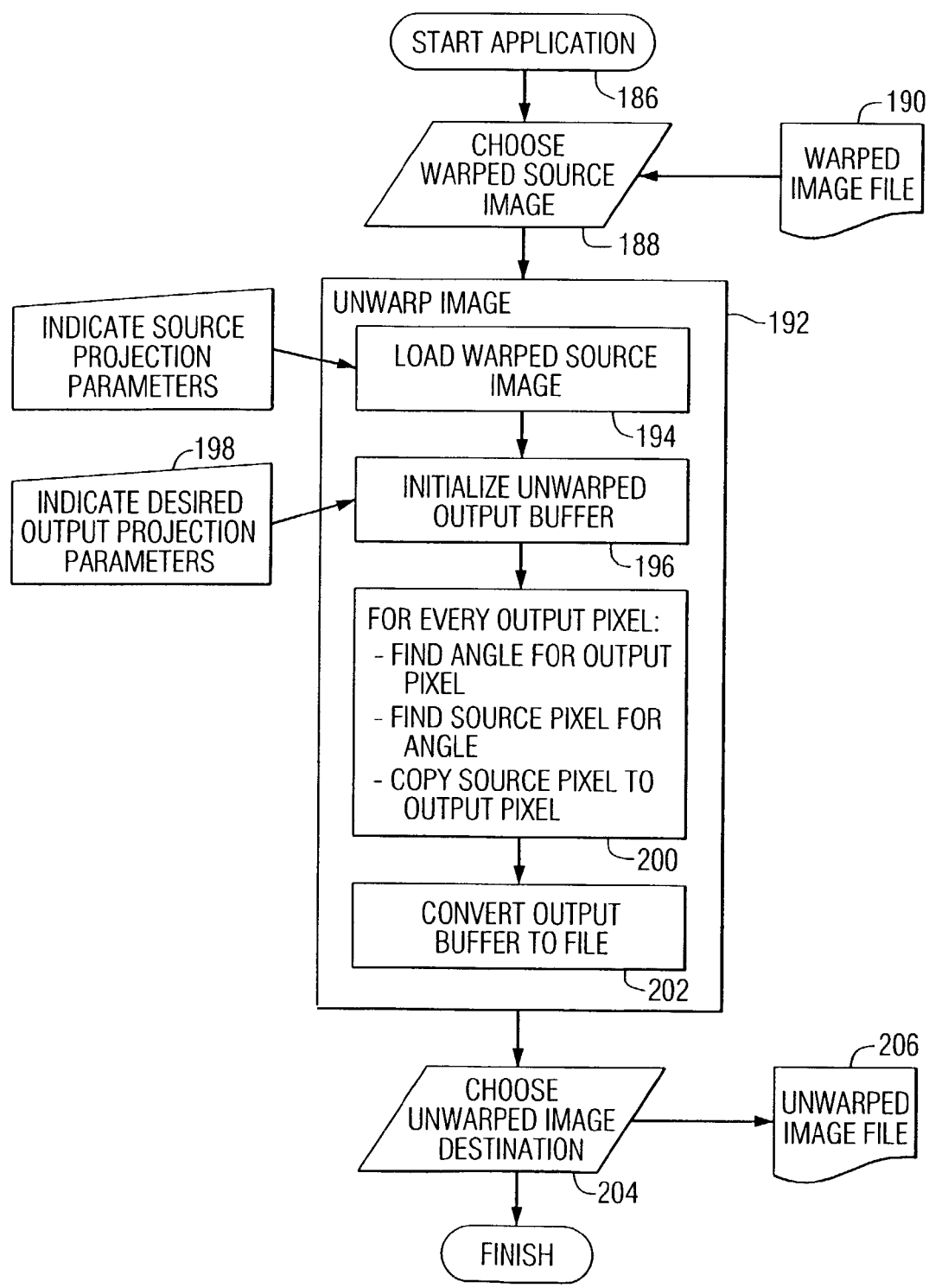
FIG. 21 is a flow diagram that illustrates a particular example of a method of the invention.

FIG. 21 is a flow diagram that illustrates a particular example of the processing method. At the start of the process, as illustrated in block 186, a warped source image is chosen as shown in block 188 from a warped image file 190. Several processes are performed to unwarp the image as shown in block 192. In particular, block 194 shows that the warped image is loaded into a buffer. The warped image buffer then includes source file pixel information and predetermined or user-specified metadata that identifies the source image projection parameters. An unwarped output image buffer is initialized as shown in block 196. The desired output projection parameters are indicated as shown in block 198. Block 200 shows that for every output pixel, the method determines the angle for the output pixel and the corresponding source pixel for the angle. The angle can be represented as $\theta$ and $\phi$, which are polar coordinates. The radius will always be one for spherical coordinates, since these images contain no depth information. Then the source pixel value is copied to the output pixel. After all output pixels have received a value, the output buffer is converted to an output file as shown in block 202. An unwarped image destination is chosen as shown in block 204 and the unwarped image file is loaded into the chosen destination as shown in block 206.

Using the described process, the warped source image can be converted into an image with a more traditional projection using an unwarping process. For example, it may be desirable to unwarp an equi-angular source image into an equi-rectangular projection image, where pixels in the horizontal direction are directly proportional to the pan (longitudinal) angles (in degrees) of the panorama, and pixels in the vertical direction are directly proportional to the tilt (latitudinal) angles (also in degrees) of the panorama.

The algorithm for the unwarping process determines the one-to-one mapping between pixels in the unwarped image and those in the warped image, then uses this mapping to extract pixels from the warped image and to place those pixels in the unwarped image, possibly using an interpolation algorithm for smoothness. Since the mapping between the unwarped and warped images may not always translate into integer coordinates in the source image space, it may be necessary to determine a value for pixels in between other pixels. Bi-directional interpolation algorithms (such as bilinear, bicubic, spline, or sinc functions) can be used to determine such values.

The unique shape and properties of the compensated equi-angular mirror combined with the functionality of the PhotoWarp software may substantially reduces a processing time associated with processing the pixel data into the viewable image. Specifically, since each pixel reflected by the mirror and captured by the camera corresponds to an equal angle, simple first order equations can be processed with the PhotoWarp software and used to quickly determine the angle for the output pixel and the corresponding source pixel for the angle, and the proper source pixel value can then be mapped to the output pixel of the viewable panoramic image. These pixels reflected by such a compensated equi-angular mirror may be referred to as equi-angular pixels, and such a mapping scheme may be referred to as a radially linear mapping scheme. This simple radially linear pixel mapping substantially reduces the processing time and the complexity of the software code needed to produce a viewable panoramic image by as much as 20 to 40 percent when compared to panoramic imaging systems that do not utilize a mirror that provides radially linear mapping between the source pixels and the output pixels. This improvement in processing time is achieved by the reduced number of calculations that must be performed on every pixel in the image.

As an example, radially linearly mapping an equi-angular source image to an equi-rectangular destination image can be quickly achieved by pre-calculating sine and cosine values for a particular pan angle in the output image, then proceeding linearly along the radius of the source image to produce columns of destination pixels. Only two multiply-add computations would be needed for each pixel in the output image, and the system memory would typically not need to be accessed to perform these calculations. A non-radially linear source mapping would require either more calculations for each pixel, or would need to generate a lookup table for radial pixels, which on modern processors can incur a performance penalty for accessing system memory.

In another embodiment, image processing may be performed using a software application, hereinafter called VideoWarp, that can also be used on various types of computers, such as Mac OS 9, Mac OS X, and Windows platforms. This software may be combined with a graphics hardware device, such as a 3-D graphics card commonly known in the art, to process images captured with a panoramic imaging device, such as the device 12 of FIG. 1, and produce panoramic images suitable for viewing. In this particular embodiment, the combination of the VideoWarp software and the graphics hardware device provide the appropriate resources typically required for processing video.

Typically, video is made up of a plurality of still images displayed in sequence. The images are usually displayed at a high rate speed, sufficient to make the changing events in the individual images appear fluid and connected. A minimum image display rate is often approximately 30 images per second, although other display rates may be sufficient depending on the characteristics of the equipment used for processing the images. While software alone may be sufficient for processing the often one million or more pixels needed for a viewable panoramic image and displaying the viewable panoramic image, software alone is typically not capable of calculating and displaying the one million or more pixels of a viewable panoramic image 30 or more times a second in order to produce a real time video feed. Therefore, in one embodiment the VideoWarp software may be used in conjunction with a graphics hardware device to process panoramic video that can be viewed and manipulated in real time, or recorded for later use, such as on a video disc (e.g. as a QuickTime movie) for storage and distribution.

VideoWarp preferably uses a layered structure that maximizes code reuse, cross-platform functionality and expandability. The preferred embodiment of the software is written in the C and C++ languages, and uses many object-oriented methodologies. The main components of the application are the user interface, source, model, projection and renderer.

The VideoWarp Core refers to the combination of the source, model, projection and renderer classes that together do the work of the application. The interface allows users to access this functionality.

The Source component manages and retrieves frames of video data from a video source. Source is an abstract class which allows the rendering of panoramic video to be independent of the particular source chosen for display. The source can be switched at any time during the execution of VideoWarp. The source is responsible for communicating with any video source devices (when applicable), retrieving frames of video, and transferring each frame of video into a memory buffer called a texture map. The texture map may represent image data in memory in several ways. In one embodiment, each pixel may be represented by a single Red, Green and Blue channel (RGB) value. In another embodiment, pixel data may be represented by luminance values for each pixel and chroma values for a group of one or more pixels, which is commonly referred to in the art as YUV format. The source may use the most efficient means possible to represent image data on the host computer system to achieve maximum performance and quality. For example, the source will attempt to use the YUV format if the graphics hardware device appears to support the YUV format. More than one source may be utilized at any given time by the renderer to obtain a more complete field-of-view.

A source may retrieve its video data from a video camera attached to the host computer, either through an analog to digital converter device to digitize analog video signals from a video camera, or through a direct digital interface with a digital camera (such as a DV or IIDC camera connected through an IEEE-1394 bus), or a digital camera connected through a camera link interface. Additionally, the source may retrieve video data from a tape deck or external storage device made to reproduce the signals of a video camera from a recording. The source may also retrieve video data from a prerecorded video file on a computer disk, computer memory device, CD-ROM, DVD-ROM, computer network or other suitable digital storage device. The source may retrieve video data from a recorded Digital Video Disc (DVD). The source may retrieve video data from a streaming video server over a network or Internet. Additionally, the source may retrieve video data from a television broadcast.

Figure 22:
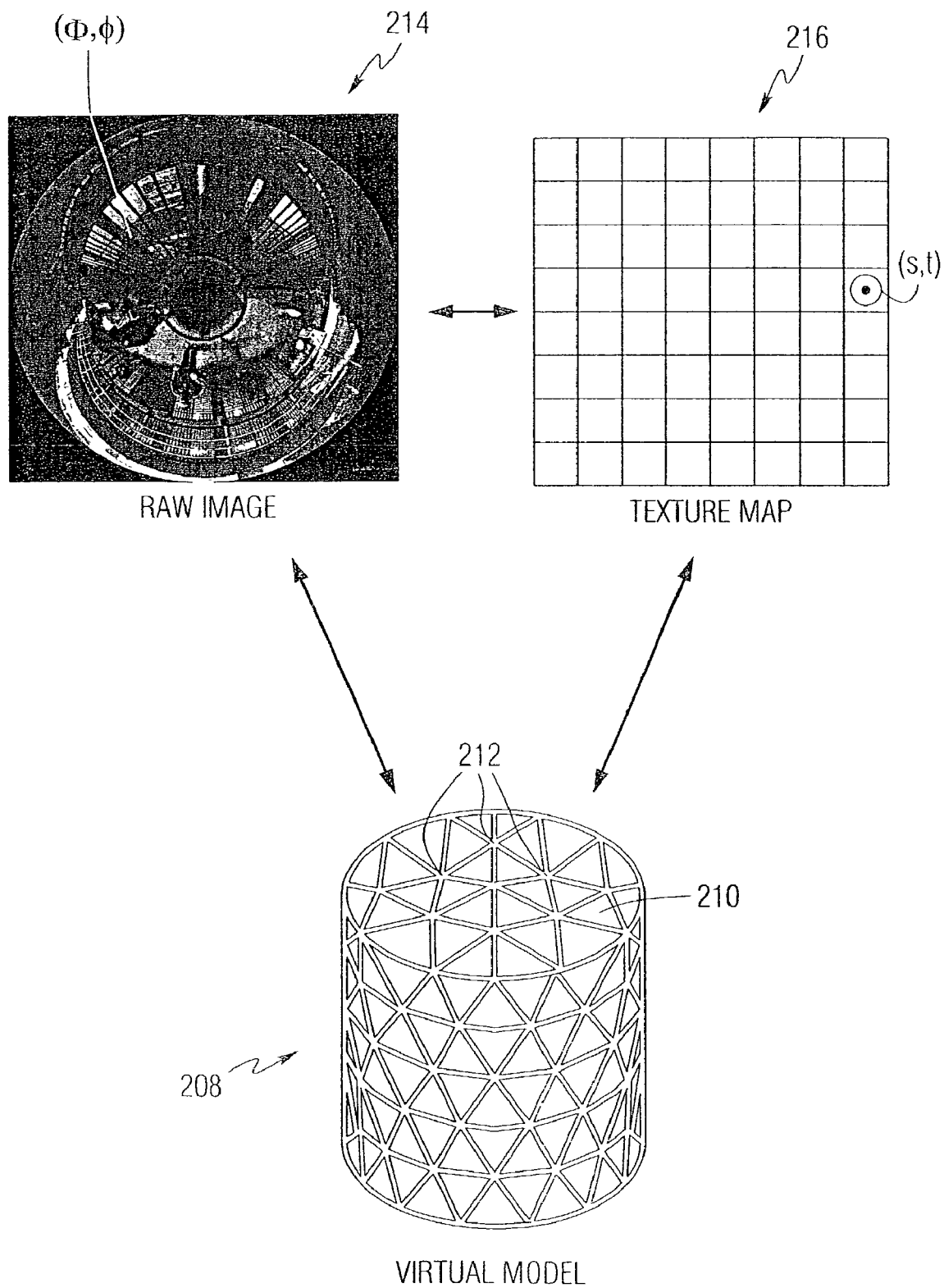
FIG. 22 is a schematic diagram illustrating how vertices and texture map coordinates may be used to produce a virtual model in accordance with an embodiment of the present invention.

The model component is responsible for producing vertices for a virtual three-dimensional model. FIG. 22 illustrates such a virtual model 208, which can be represented by triangles 210 grouped together to form the geometry of the virtual model. The intersections of the triangles 210 are the vertices 212, and such vertices in the virtual model are points corresponding to space vectors in the raw or "warped" image 214 of FIG. 22. These vertices 212 produced by the model component essentially form a "skeleton" of the virtual model. The virtual model will typically be a representative model of the final viewable panoramic image. In this embodiment the vertices 212 of the virtual model 208 will remain constant even though the scene may be changing. This is because even though the scene may be changing, the relationship between the space vectors of the raw image and the corresponding points on the virtual model will be the same provided the model is not changed. The fact that the vertices may remain constant is an advantage, as the vertices may be determined once, and then used to produce the multiple still images needed to create the panoramic video. This will save on processor resources and may reduce the amount of time and latency associated with processing and displaying the video.

Model is an abstract class which allows the rendering of panoramic video to be independent of the particular model chosen for display. The model can be switched at any time during the execution of VideoWarp. If the model is switched, the vertices will need to be calculated again. The model may represent a cube or hexahedron, a sphere or ellipsoid, a cylinder having closed ends, an icosahedron, or any arbitrary three-dimensional model. The model preferably will encompass a 360 degree horizontal field of view from a viewpoint in the interior, and a vertical field of view between 90 degrees and 180 degrees. The model may encompass a lesser area should the coverage of the source video be less than that of the model, or to the boundary of the area to visible to the user. Models can be varied over time to provide transitions or animations to the user display. Transitions may be used between models to smooth or "morph" between displays that represent different views of the panoramic video to the user.

The projection component is used by the model to compute texture map coordinates for each vertex in the model. Texture map coordinates refer to a particular point or location within a source texture map, which can be represented by s and t. The projection defines the relationship between each pixel in the source texture map and a direction (θ, φ) of the panoramic source image for that pixel. The direction (θ, φ) also corresponds to a particular vertex of the virtual model, as described above. Projection provides a function which converts the (θ, φ) coordinates provided for a vertex of the model to the corresponding s and t texture map coordinate. When the viewable image is displayed, the point (s, t) of the texture map will be pinned to the corresponding vertex, producing a "skin" over the skeleton of the model which will be used to eventually reproduce substantially the entire original appearance of the captured scene to the user. This is also illustrated in FIG. 22, where a particular point (s, t) is shown on a texture map 216 and corresponds to a direction (θ, φ) of the raw source image 214 for that pixel location (s, t), and also corresponds to a vertex of the virtual model 208. In this embodiment, provided that the camera is not moved and the mirror is securely mounted so that it does not move in relation to the camera, the texture map coordinates of the virtual model 208 will remain constant even though the scene may be changing. This is because the projection of the source image and its relationship to the model remains constant. The fact that the texture map coordinates may remain constant is an advantage, as the texture map coordinates may be determined once, and then used to produce the multiple still images needed to create the panoramic video. This will save on processor resources and may reduce the amount of time and latency associated with processing and displaying the video.

Projection is an abstract class which allows the rendering of panoramic video to be independent of the particular projection chosen to represent the source image. The parameters of the projection may be changed over time as the source video dictates. The projection itself may be changed at any time during the execution of VideoWarp. If the projection is changed, the texture map coordinates will need to be calculated again. The projection may represent an equi-angular mirror, an unrolled cylinder, an equi-rectangular map projection, the faces of a cube or other polyhedron, or any other projection which provides a 1-to-1 mapping between directional vectors (θ, φ) and texture map coordinates (s,t).

Figure 23:
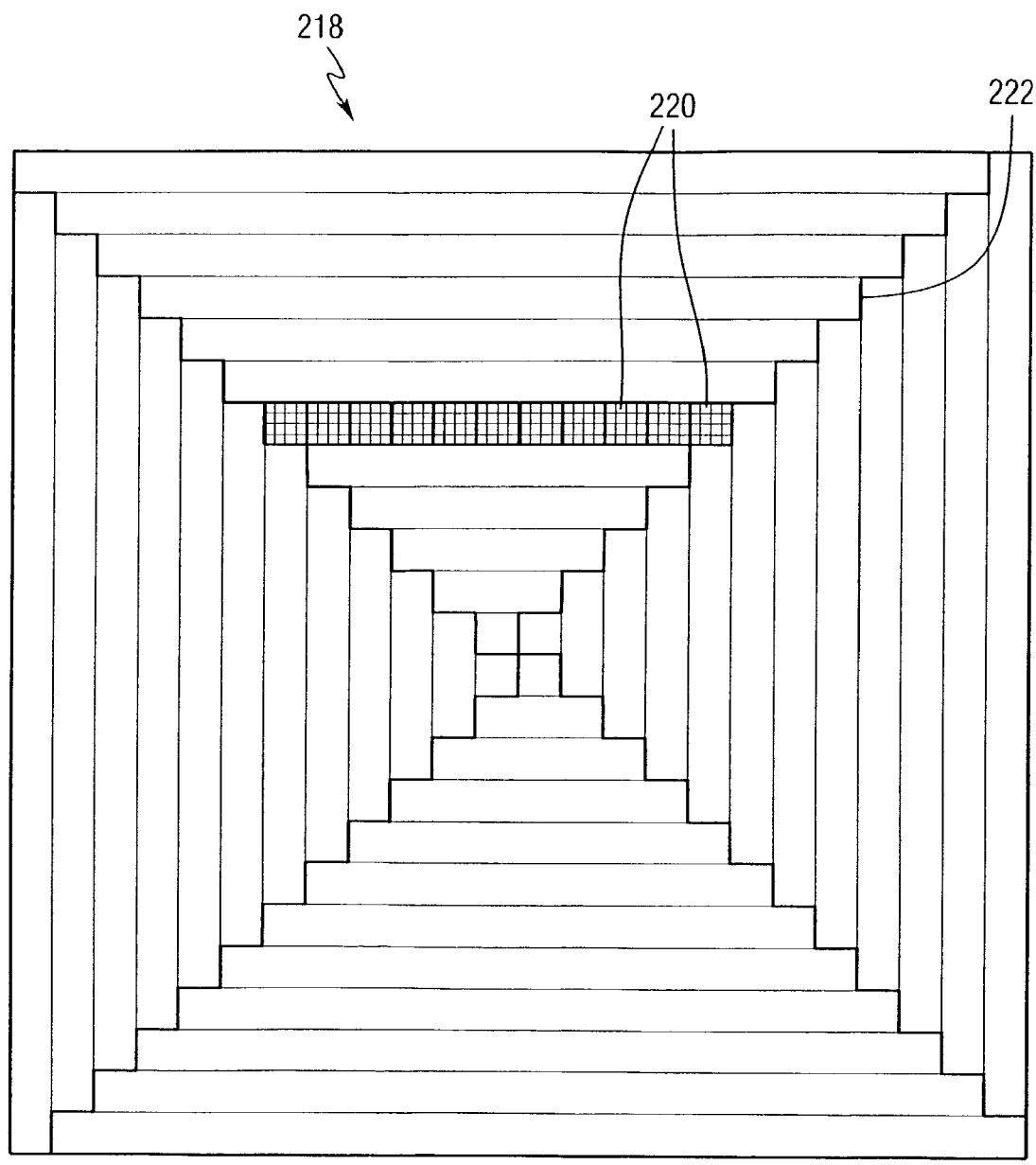
FIG. 23 is a partial equi-rectangular projection of a panoramic image in accordance with an embodiment of the present invention.

In one embodiment, the projection may utilize an encoding method and apparatus to provide an encoded projection, as disclosed in copending commonly owned U.S. patent application Ser. No. 10/227,136 filed Aug. 23, 2002, which is hereby incorporated by reference. Such an encoding method and apparatus may be utilized for making the pixel data of the images more suitable for transmitting over a computer network and/or for storing on a computer system. In this embodiment, in order to make the pixel data more suitable for transmitting over a computer network, such as compressing the pixel data, the projection may be a partial equi-rectangular projection, which can be defined as a rectangular array of pixels representing a portion of an equi-rectangular projection of the panoramic image. More specifically, pixel data may be divided into equi-rectangular blocks of pixels having a width substantially equal to a width of a macro-block of pixel data and a length substantially equal to an integer multiple of a length of a macro-block of pixel data. As used herein, the term "macro-block" refers to a group or block of pixels, wherein the macro-block has a width w that may be measured in pixels and a length l that may be measured in pixels. In this way, it will be ensured that a compression artifact source, such as a sharp line, will only occur on a perimeter of a macro-block of pixel data. As used herein, the term "compression artifact source" refers to a line, boundary, or other portion of an uncompressed image that crosses over at least one individual pixel of the image and may cause visible distortions in the image when the image is compressed and then later uncompressed for viewing. Such a partial equi-rectangular projection 218 is shown in FIG. 23. As shown in FIG. 23, pixels 220 have been arranged into blocks that are multiples of the size of a macro-block of pixel data, in this case corresponding to a macro-block of pixel data having a width w of 4 pixels and a length l of 4 pixels. The result is that sharp lines dividing the projection into four quadrants have now assumed a "step" pattern, such as the sharp line 222 in FIG. 23, ensuring that the sharp-lines will only fall between macro-blocks of pixel data, i.e., on the perimeter of a macro-block. This may substantially reduce or in some cases eliminate compression artifacts or distortions from appearing in the viewable image.

Figure 24A:
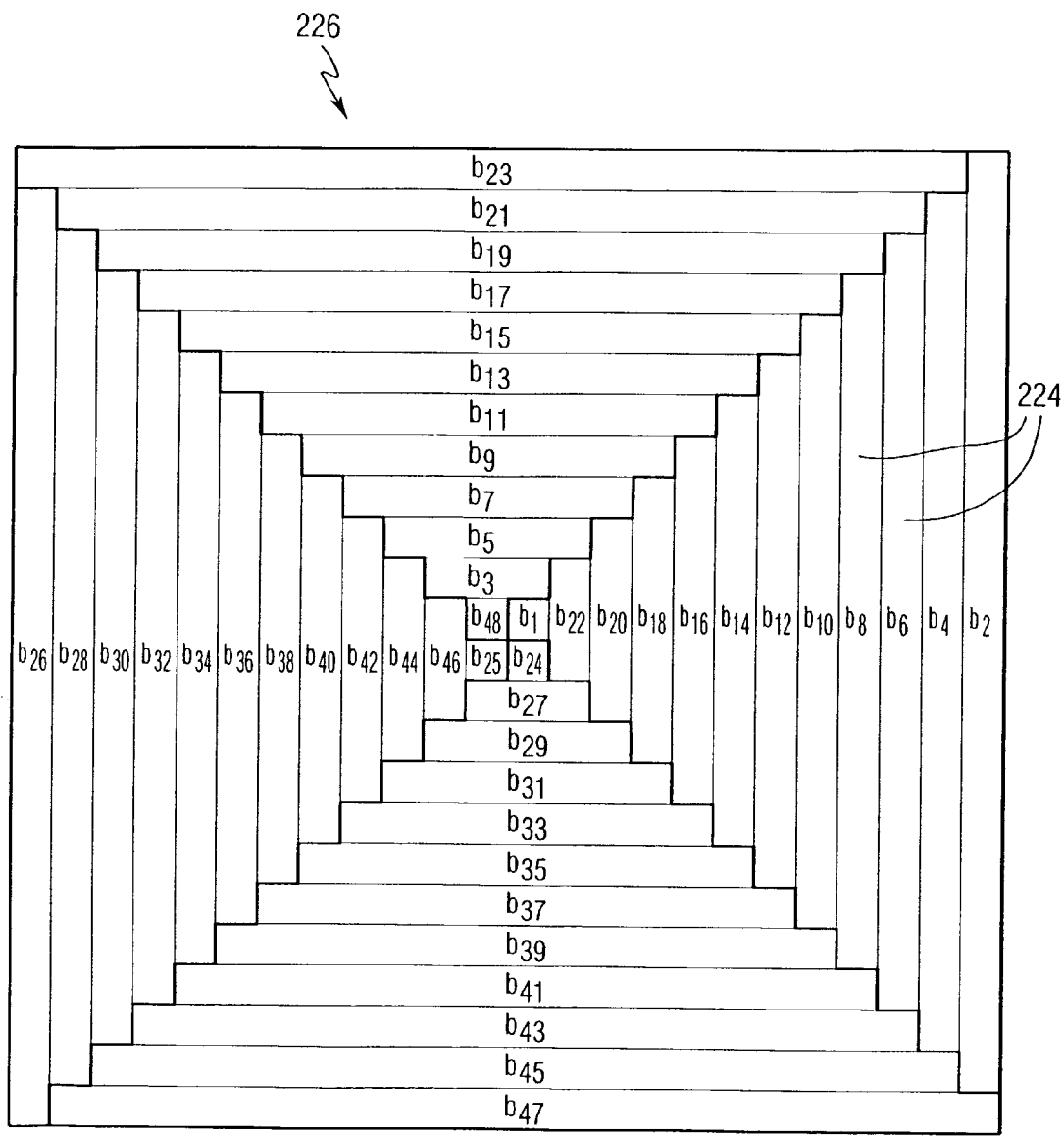
FIG. 24a is a partial equi-rectangular projection of a panoramic image in accordance with an embodiment of the present invention.
Figure 24B:
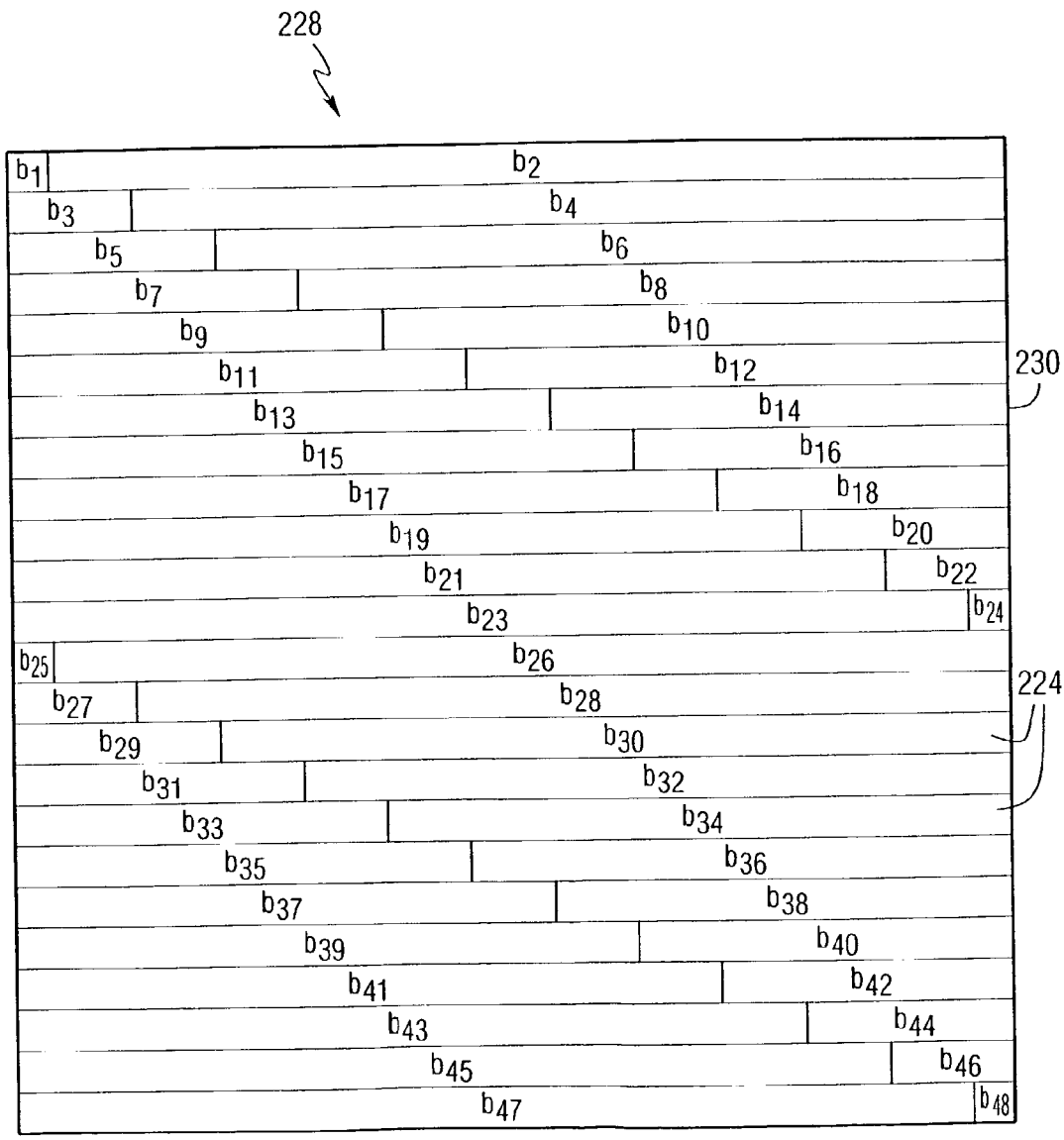
FIG. 24b is the partial equi-rectangular projection of FIG. 24a arranged in an alternating sectors pattern.

In order to make the pixel data more suitable for storing on a computer system, the partial equi-rectangular projection 218 of FIG. 23 may be transformed into a modified partial equi-rectangular projection, which can be defined as a projection in which the pixel data has been arranged so that the pixel data may be more conveniently accessed by a memory buffer. FIGS. 24a and 24b illustrate one manner in which the equi-rectangular blocks of the partial equi-rectangular projection 218 may be arranged so that the pixel data may be conveniently accessed by a memory buffer. As shown in FIG. 24a, the equi-rectangular blocks 224 of a partial equi-rectangular projection 226 may be identified as blocks $b_1$ through $b_{48}$, and the equi-rectangular blocks 224 may then be arranged in the pattern shown in FIG. 24b, creating a modified partial equi-rectangular projection 228. To obtain this pattern, equi-rectangular block $b_1$ of FIG. 24a is placed first, as shown in FIG. 24b. Equi-rectangular block $b_2$ is placed next as shown in FIG. 24b, then equi-rectangular block $b_3$, and so on. The equi-rectangular blocks 224 of FIG. 24a may continue to be placed in the order shown in FIG. 24b until the square frame 230 shown in FIG. 24b is substantially filled with the equi-rectangular blocks 224 from FIG. 24a. In this embodiment, such a resulting modified partial equi-rectangular projection 228 may be referred to as an alternating sectors pattern.

In one embodiment of the invention, a data table may be created containing pixel attribute data corresponding to the pixel data of the partial equi-rectangular projection 226 shown in FIG. 24a. As used herein, the term "pixel attribute data" refers to information that describes particular attributes of a piece of pixel data, i.e., a macro-block. Example macro-block attribute data may include, but is not limited to, the elevation angle φ representing the tilt angle of one edge of the partial equi-rectangular block, the elevation angle scaling factor $s_φ$ in degrees per pixel indicating how the tilt angle changes along an axis of the block, the rotation angle θ for the pan angle of another edge of the block, and the rotation angle scaling factor $s_θ$ in degrees per pixel to indicate the change in pan angle for each pixel along the other axis of the macro-block. Such pixel attribute data corresponding to each pixel in the partial equi-rectangular projection 226 shown in FIG. 24a may be stored in such a data table, and the data in the data table may be grouped and ordered corresponding to the equi-rectangular blocks 224 shown in FIG. 24a. In this manner, the macro-blocks of pixel data making up each equi-rectangular block 224 may be easily grouped together so that the partial equi-rectangular projection 226 shown in FIG. 24a may be easily recreated from the alternating sectors arrangement of pixel data shown in FIG. 24b, and vice versa. This data table may be stored in a destination image file, along with the pixel data of the destination data set, so that the partial equi-rectangular projection of FIG. 24a may be readily reproduced once the photographic image data has been transmitted to a destination for processing into a viewable image. Alternately, a well-known data table for a transmission can be generated by the destination processor and applied to incoming image data.

Figure 25A:
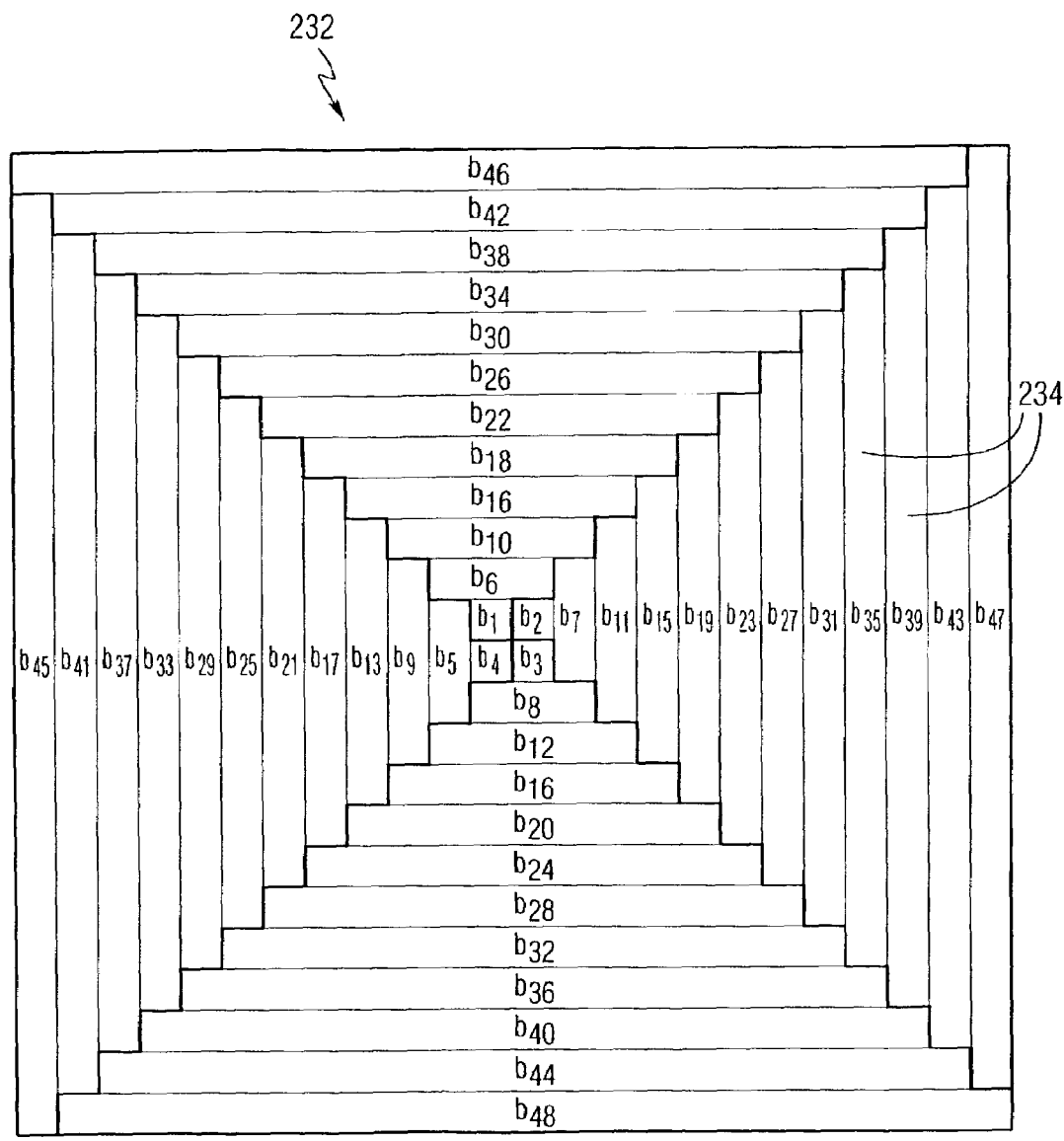
FIG. 25a is a partial equi-rectangular projection of a panoramic image in accordance with another embodiment of the present invention.
Figure 25B:
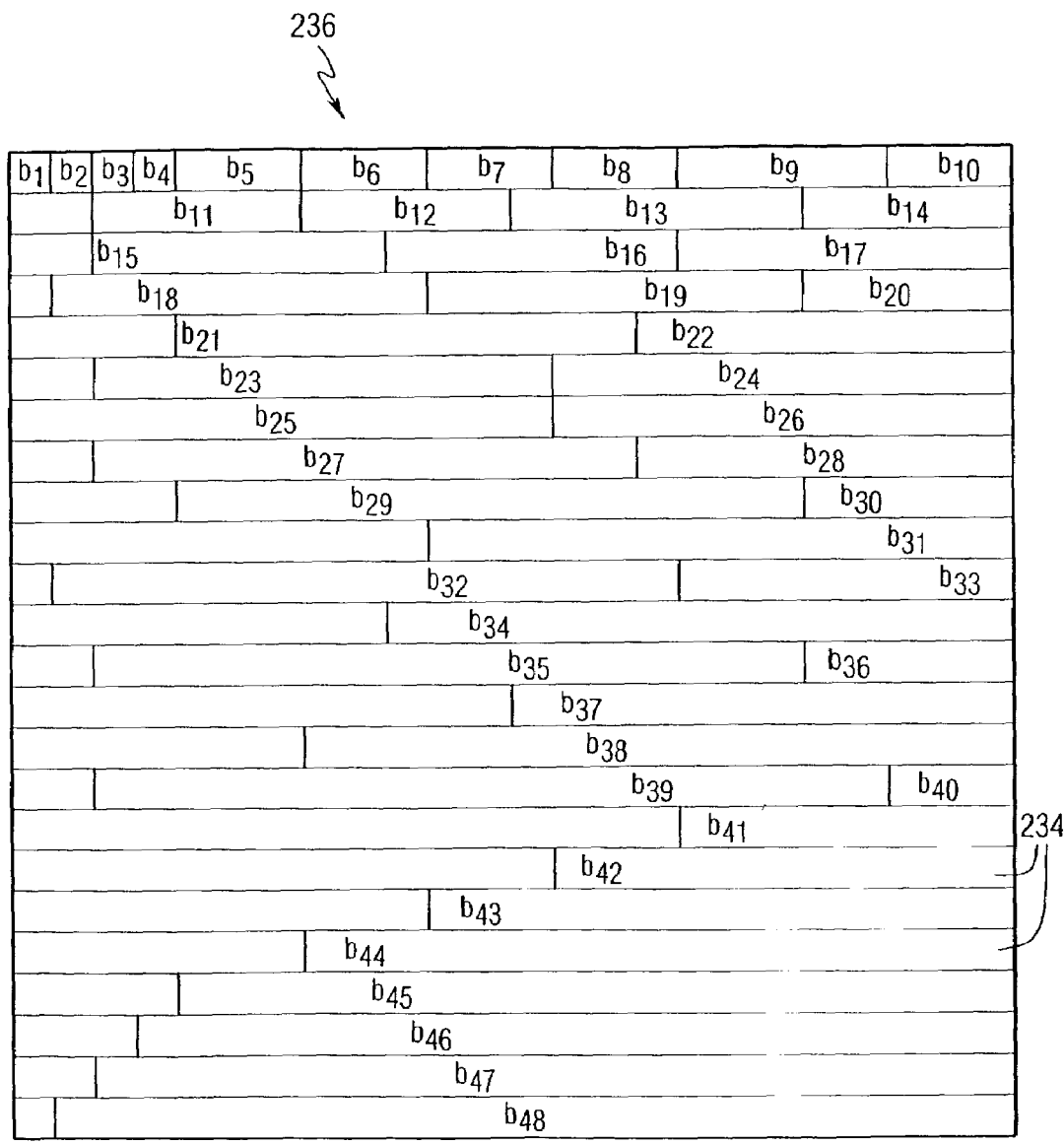
FIG. 25b is the partial equi-rectangular projection of FIG. 25a arranged in a linear increasing phi major pattern.

Other modified partial equi-rectangular projections containing patterns of arranged equi-rectangular blocks may be used. In one embodiment, a linear increasing phi major pattern may be used. As used herein, the term "phi major pattern" refers to the ordering of macro-blocks first by their minimum phi angle as stored in the data table representation. FIG. 25a shows a partial equi-rectangular projection 232 of pixel data divided into equi-rectangular blocks 234, and FIG. 25b shows the equi-rectangular blocks 234 of the partial equi-rectangular projection 232 arranged in a modified partial equi-rectangular projection 236 having a linear increasing phi major pattern. The equi-rectangular blocks 234 may be numbered as shown in FIG. 25a and then arranged in the order shown in FIG. 25b to create the modified partial equi-rectangular projection 236.

Figure 26A:
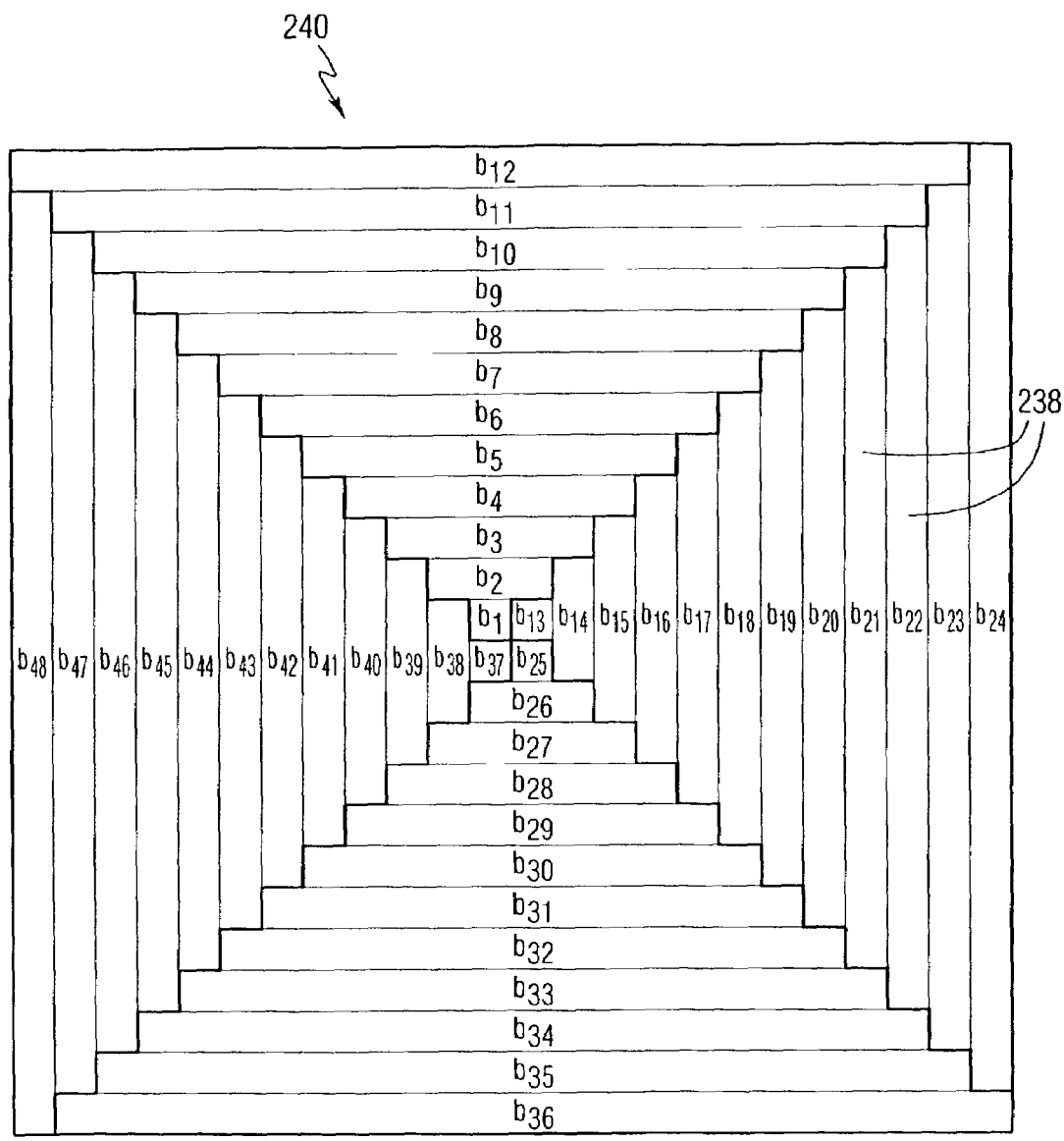
FIG. 26a is a partial equi-rectangular projection of a panoramic image in accordance with another embodiment of the present invention.
Figure 26B:
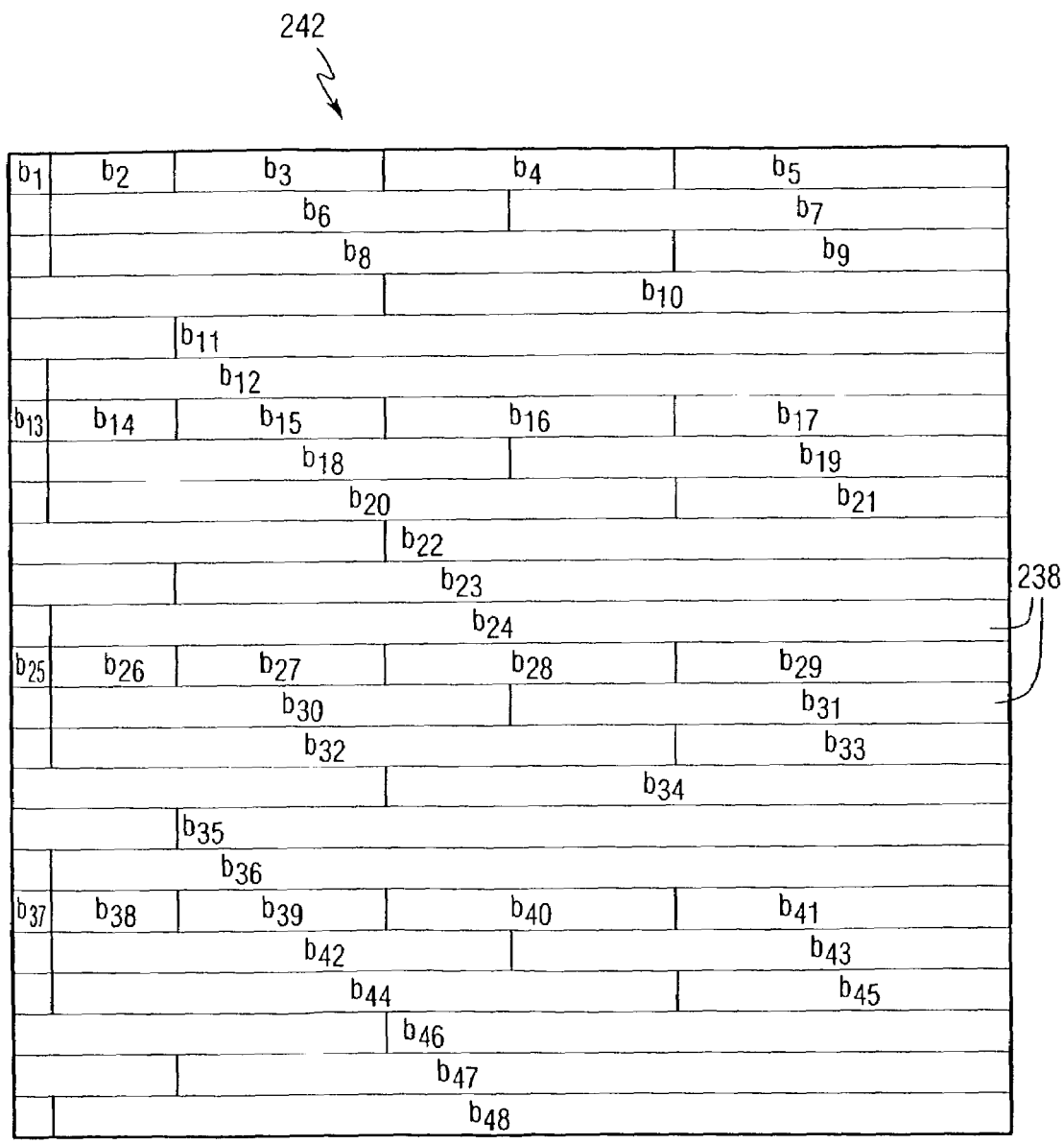
FIG. 26b is the partial equi-rectangular projection of FIG. 26a arranged in a 4 sectors phi major pattern.

FIGS. 26a and 26b illustrate an embodiment, wherein the equi-rectangular blocks 238 of the partial equi-rectangular projection 240 shown in FIG. 26a are arranged in modified partial equi-rectangular projection 242 having a four sectors phi major pattern as illustrated in FIG. 26b. As used herein, the term "phi major pattern" means blocks from each quadrant are ordered first by their phi (tilt) axis, then by their theta (pan) axis. The four sectors phi major pattern shown in FIG. 26b may be used because this pattern provides improved memory locality, i.e., improved sequential data access, which can increase the speed and performance of the encoding process described herein. The alternating sectors pattern provides optimum memory locality because pixels for each quadrant of the original annular image are grouped together, providing optimal memory locality when producing a perspective view of the panoramic image.

The equi-rectangular blocks of a partial equi-rectangular projection may also be arranged in a modified partial equi-rectangular projection having a purely random pattern. This may be used as a form of encryption, as the receiver of the random patterned projection would need to have the corresponding data table so that the equi-rectangular blocks may be placed back in a partial equi-rectangular projection in the proper order.

Although the use of such an encoding scheme is particularly suitable for video applications, because of the large amounts of bandwidth and computer processing resources often required to process such video, this encoding scheme may be used in conjunction with the PhotoWarp software for producing encoded panoramic images, and such a use is within the present scope of the invention.

The renderer component manages the interactions of all the other components in VideoWarp. Renderer is an abstract class which allows the rendering of panoramic video to be independent of the particular host operating system, 3D graphics framework, and 3D graphics architecture. A particular renderer is chosen which is compatible with the host computer and will achieve the maximum performance. The Renderer is in use for the lifetime of the application.

At the start of the application, the renderer uses the facilities of the host operating system to initialize the graphics hardware device, often using a framework such as OpenGL or Direct3D. The renderer may then determine the initial source, model and projection to use for the session and initializes their status. Once initialized, the renderer begins a loop to display panoramic video:

1) Determine user's preferred viewing direction.
2) Set viewing direction in graphics hardware device.
3) Determine if the model needs to be changed. Re-initialize if necessary.
4) Determine if the projection needs to be changed. Re-initialize if necessary.
5) Determine if the source needs to be changed. Re-initialize if necessary.
6) Request a frame of source video from the active source.
7) Request the graphics hardware device to draw the viewable image.
8) Repeat.

The renderer may execute some of the above processes simultaneously by using a preemptive threading architecture on the host platform. This is used to improve performance and update at a smooth, consistent rate. For example, the renderer may spawn a preemptive thread that is responsible for continually retrieving new source video frames and updating the source texture map. It may also spawn a preemptive thread responsible for issuing redraw requests to the graphics hardware device at the maximum rate possible by the hardware. Additionally, the renderer may make use of the features of a host system to execute direct memory access between the source texture map and the graphics hardware device. This typically eliminates the interaction of the computer CPU from transferring the large amounts of image data, which frees the CPU to perform other duties and may greatly improve the performance of the system. The renderer may also pass along important information about the host system to the source, model and projection components to improve performance or quality. For example, the renderer may inform the source that the graphics hardware device is compatible with YUV encoded pixel data. For many forms of digital video, YUV is the native encoding of pixel data and is more space-efficient than the standard RGB pixel format. The source can then work natively with YUV pixels, avoiding a computationally expensive conversion to RGB, saving memory and bandwidth. This will often result in considerable performance and quality improvements.

Figure 27:
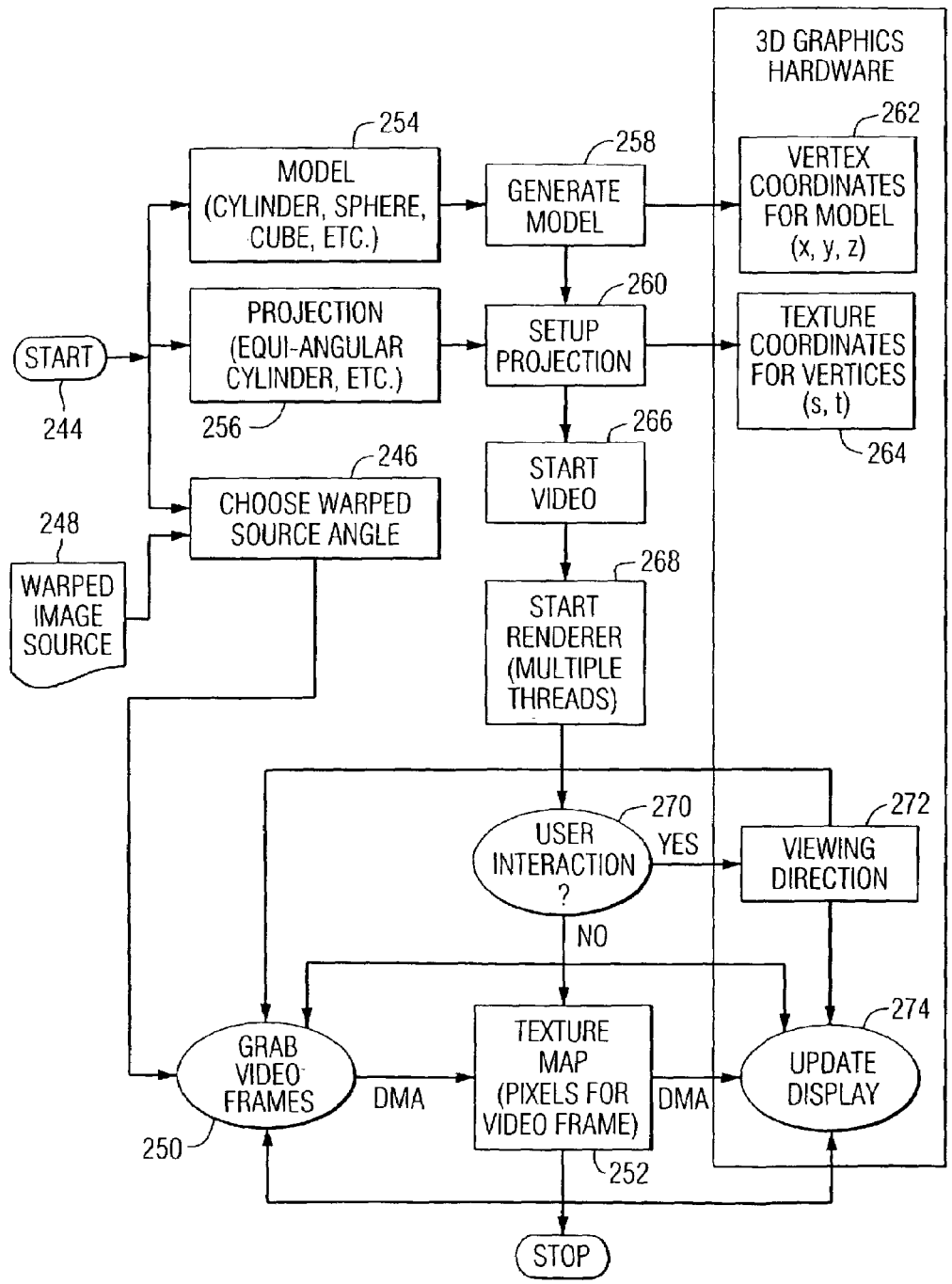
FIG. 27 is a flow diagram that illustrates a particular example of a method of the invention.

FIG. 27 is a flow diagram that illustrates a particular example of the processing method. At the start of the process, as illustrated in block 244, a warped source image is chosen as shown in block 246 from a warped image source 248. Several processes are performed to unwarp the image. In particular, block 250 shows that the warped image is "captured" by a video frame grabber, and block 252 shows that the pixel data from the source image is transferred to a texture map memory buffer as a texture map. Block 254 shows that a user or pre-determined meta-data can identify a particular virtual model to use, and block 256 shows that a user or pre-determined meta-data can identify a particular projection to use. In block 258 the vertices are produced for the virtual model, and in block 260 the projection is set up by computing the texture map coordinates for the vertices of the virtual model. Next, the virtual model is transferred to a graphics hardware device by transferring the vertex coordinates as shown in block 262 and transferring the texture map coordinates as shown in block 264. Block 266 shows that video is now ready to be displayed. In particular, block 268 shows that the renderer may spawn multiple and simultaneous threads to display the video. At block 270, the render can determine if the user has entered particular viewing parameters, such as zooming or the particular portion of the panorama to view, as shown in block 272, and instruct the hardware to make the appropriate corrections to the virtual model. Back at block 252 the renderer can make the pixel data of the current texture map from the texture map memory buffer available to the graphics hardware device, and at block 250 the renderer can instruct the software to "capture" the next video frame and map that pixel data to the texture map memory buffer as a new texture map at block 252. The graphics hardware device will use the pixel data from the texture map memory buffer to complete the virtual model, and will update the display by displaying the completed virtual model as a viewable panoramic image as shown at block 274. In one embodiment, the graphics hardware device may utilize an interpolation scheme to "fill" in the pixels between the vertices and complete the virtual model. In this embodiment, a barycentric interpolation scheme could be used to calculate the intermediate values of the texture coordinates between the vertices. Then, a bilinear interpolation scheme could be used on the source pixels residing in the texture map to actually transfer the appropriate source pixel into the appropriate location on the model. The renderer can continue these procedures in a continuous loop until the user instructs the process to stop, or there is no longer any pixel data from the warped image source. FIG. 27 also shows that direct memory access (DMA) can be utilized if the hardware will support it. DMA can be used, for example, in allowing the texture map from the captured video frame to be directly available for the graphics hardware device to use.

The Interface layer is the part of the VideoWarp application visible to the user. It shelters the user from the complexity of the underlying core, while providing an easy to use, attractive front end for their utility. VideoWarp can provide a simple one-window interface suitable for displaying panoramic video captured with a reflective mirror optic. Specifically, VideoWarp enables the following capabilities:

Open panoramic video sources from files, attached cameras, video streams, etc.

Setting or adjusting the parameters of the source projection.

Choosing the model and display style for rendering.

Interacting with the panoramic video to choose a display view

Saving panoramic video to disk for later playback, archiving or exchange.

The implementation of the interface layer varies by host platform and operating system. The appearance of the interface is similar on all platforms to allow easy switching between platforms for users.

In some instances, the resolution of a captured source image may be so great that a single texture map may not be able to accommodate all of the pixel data from the captured image. In many instances the graphics hardware device may only allow the texture map to be a maximum size, such as 2048 by 2048 pixels, or 4096 by 4096 pixels. If an image is captured having a resolution of 8192 by 8192 pixels, the single texture map would not be able to accommodate it. In one embodiment, multiple texture maps may be created, and the texture map coordinates may be computed for the multiple texture maps. When the texture map coordinates are computed, the multiple texture maps may be considered as a "single" texture map, so that stitching effects commonly associated with multiple texture maps will not appear in the resulting viewable image or images.

The speed realized from the combination of the VideoWarp software and a graphics hardware device can be utilized to display interlaced video. The term interlaced video refers to video having video frames consisting of two fields displayed in two passes. Each field contains every other horizontal line of the video frame. An interlaced video system displays the first field as a frame of alternating lines over the entire screen, and then displays the second field to fill in the alternating gaps left by the first field. One field can consist of the "even" lines of the video frame and can be referred to as an even frame of video, and the other field can consist of the "odd" lines of the video frame and can be referred to as an odd frame of video. Many video cameras on the market exclusively capture video in an interlaced fashion. Interlaced is preferred, often in NTSC or PAL television broadcasts, due to its ability to provide persistence of vision at lower bandwidths, since only half of the data required to fill an entire frame of video is transmitted at one time. However, a drawback of using an interlaced video scheme is that each "half" frame of video must typically be displayed at an interlaced video rate, such as $\frac{1}{60}^{th}$ of a second intervals, in order to achieve an overall video frame rate of $\frac{1}{30}^{th}$ of a second. VideoWarp combined with a graphics hardware device provides an appropriate speed for displaying interlaced video.

In one embodiment, two texture map memory buffers may be created, one for storing the pixel data of the even lines of an interlaced video frame, and one for storing the odd lines of an interlaced video frame. These buffers may be half the size of a buffer needed to store a full frame of video. The VideoWarp software and graphics hardware device can then process the incoming pixel data in the same manner as already described herein. When the graphics hardware device utilizes the pixel data from the texture map memory buffers to complete the virtual model, the texture map coordinates can be scaled by one half in the vertical direction, which will effectively "stretch" the odd or even lines of video back to a full frame size, and then an interpolation scheme can be used to complete the frame. By utilizing such an interpolation scheme, the quality of the resulting video can be improved and the interlacing effect will not be visible. The graphics hardware device can then show the even and odd frames of video in an alternating fashion, at a rate of approximately 60 frames per second. In this embodiment, a viewer may notice a slight discontinuity or "jitter" in the video stream as the even and odd frames are displayed. To eliminate the discontinuity, the texture map coordinates of the even frames of video may be shifted in the vertical direction by one half of the distance spanned by a pixel. Although this procedure typically eliminates the discontinuity in the displayed video, the texture map coordinates will now change with every complete frame of video displayed and will have to be re-calculated each time. This may be remedied by instructing the software and hardware to construct two virtual models, one to be used for even frames of video, and one to be used for odd frames of video. Two sets of texture coordinates could be calculated initially, and then utilized for rendering the entire video stream, provided the camera and mirror in relation to the camera are not moved, and/or if the source projection is changed. Alternatively, a technique known in the art and referred to as multi-texturing may used if the graphics hardware device supports this technique. Only one virtual model would be typically be needed if multi-texturing is used.

In another embodiment, two full frame size texture map memory buffers may be created, one for storing the pixel data of the even lines of an interlaced video frame, and one for storing the odd lines of an interlaced video frame. Viewing the frames alone, the odd lines of the even video frame would appear as a solid color, and the even lines of the odd video frame would appear as a solid color. An interlaced filter, which is well known in the art, could be used to interpolate the even lines of the even video frame across the odd lines, and to interpolate the odd lines of the odd video frame across the even lines. The frames can then be displayed in an alternating sequence as described above.

The speed realized from the combination of the VideoWarp software and a graphics hardware device can also be utilized to interactively eliminate a skew effect from a viewable panoramic image in real time, i.e., to eliminate any undesired horizontal or vertical offset of an image that may cause it to appear "crooked". Specifically, a view within a particular panoramic image can be represented by a particular set of coordinates (p,y,r,f) for the pitch (tilt), yaw (pan), roll (rotation) and field-of-view. For a panoramic image taken with a camera leveled relative to the ground, these coordinates will typically be correct and the viewable image will have the proper alignment within the viewing frame. However, if the camera was not level when the image was captured, the view may appear crooked, i.e., the pitch (tilt), yaw (pan), roll (rotation) and field-of-view coordinates may not have the proper values needed to present an aligned image. The amount of deviation from the normal for the camera in such a case can be represented with three coordinates ($\partial p$, $\partial y$, $\partial r$). The "crookedness" apparent in the view can be compensated by adding offsets to the view which negate the deviation in the original image. For an image taken that was deviated from the norm by ($\partial p, \partial y, \partial r$), the corrected viewing coordinates for a desired view (p,y,r,f) may be represented by (p-$\partial$, p), (y-$\partial$, y), (r-$\partial$, r) and f. By using the VideoWarp software combined with a graphics hardware device, a user could quickly be presented with a real-time preview of what the captured panoramic image would look like. If it appears to the user that the captured image is skewed, the user could utilize the software interface to automatically adjust the pitch, roll, yaw and/or field of view of the image until the skew effect is eliminated. As the user manipulates the pitch, roll, yaw and/or field of view through the software interface, the graphics hardware could continuously calculate updated values for (p-$\partial$, p), (y-$\partial$, y), (r-$\partial$, r) and f and update the image in real time, essentially presenting a sequence of still viewable panoramic images as a "mini" video, with each still image having a slightly less skewed effect. When the user is presented with a viewable image that has the desired pitch, yaw, roll, and/or field of view, that particular image could be saved via the software interface as the final corrected viewable panoramic image. The skew may also be corrected automatically, by utilizing a device that can measure the pitch, yaw, and roll of the mirror. Software and/or hardware could then utilize the measurements provided by the device to compensate and correct the potentially skewed image.

The VideoWarp software combined with a graphics hardware device may also be able to eliminate "jitter" effects that can often be noticed in video, due to the camera capturing the video not being held perfectly steady. Portions of the video may be tracked from frame to frame, and the software and/or hardware may analyze the portions as they change, determining if the tracked portions represent changes that would be indicative of the camera being slightly rotated or shaken. The software and/or hardware may then compensate for the difference in the tracked portions, thus stabilizing the video.

The user interface component of both the PhotoWarp and VideoWarp software allows a viewer to change the viewing perspective of the resulting viewable panoramic image. In the VideoWarp context, the speed with which frames of video may be produced provides a substantial real-time update of the resulting video as the user changes the viewing perspective, without noticeable lag or latency. The viewing perspective may be altered by allowing the user to "look" up and concentrate on the top portion of the resulting viewable panoramic images, to "look" down and concentrate more on the bottom portion of the resulting viewable panoramic images, to pan around the entire 360° horizontal field of view of the resulting viewable panoramic images, as if from a stationary reference point in the captured scene, and/or to "zoom" in or out on portions of the resulting viewable panoramic images. In the VideoWarp context, the viewing perspective may be rendered by placing a "virtual" camera in the center of the model, which typically simulates a user's head and the view they would see if they were standing in the middle of the model. A user requesting a change in the viewing direction can be likened to the user altering the roll, pitch, and/or yaw of his or her head. As the roll, pitch, and/or yaw changes, the orientation of the virtual camera can be altered accordingly, thus changing the viewing perspective of the resulting viewable image or images. The user or viewer may use a mouse, a keyboard, a track ball or any other haptic device to facilitate altering the viewing perspective of the viewable panoramic images. In another embodiment, the viewer may use a head tracker coupled with a head mounted device to facilitate altering the viewing perspective of the viewable panoramic images. In this embodiment, the viewer is given the sense that he or she is standing in the center of the scene that was captured with the panoramic camera.

In one embodiment of the present invention, a target apparatus, such as a fixed target, may be provided that attaches to the base of a mirror, such as the mirror 14 of the system 10. The plane of the target apparatus may be placed substantially perpendicular to the optical axis of the camera, and may be placed behind the mirror at such a distance as to not obscure useful panoramic image data.

Figure 28:
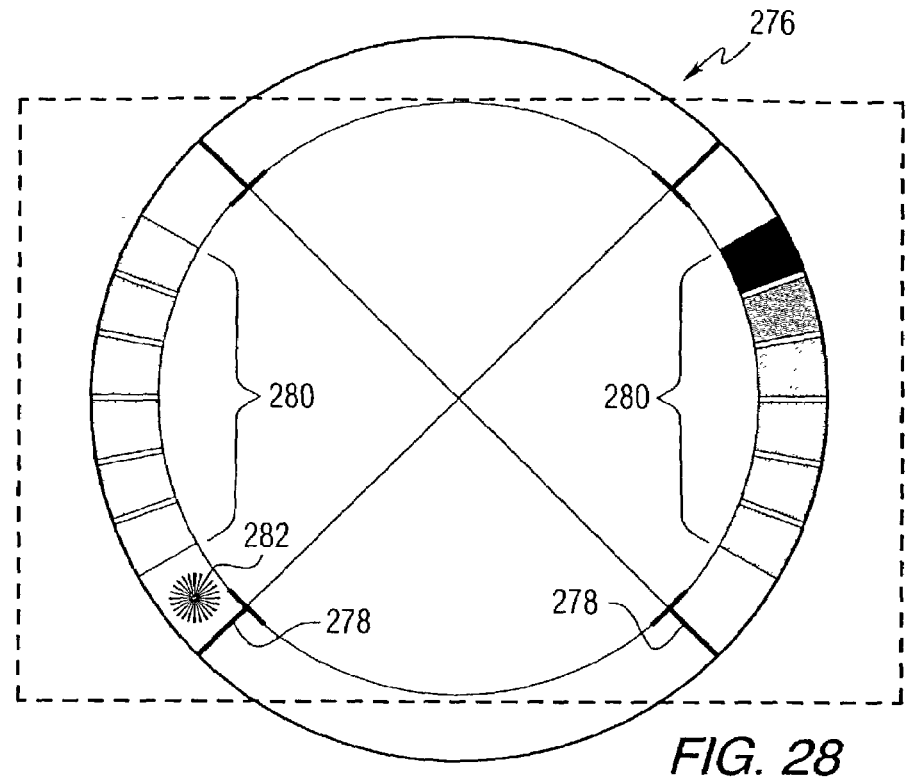
FIG. 28 is a schematic representation of a target apparatus in accordance with an embodiment of the present invention.

FIG. 28 shows such a target apparatus 276. The target may be made from an opaque material, or a semi-transparent or translucent material, and may contain one or more target elements, which may be used either by a human operator or a computer software application or other computer processing means to describe quantitative aspects of the image at the time the photograph is taken. Such target elements can be identified, read, and processed by a human operator, a computer software application, or any other suitable processing means. The target apparatus may have extended portions, which present certain target elements at more appropriate focal distances for their application. The target apparatus may be of any shape that is suitable for use with the specific mirror and camera arrangement being used, such as square, rectangular, or circular. The target apparatus may be placed far enough behind the mirror to be absent from the mirror's reflection when viewed from the camera. When photographed, at least a portion of the target will typically appear in part of the captured image not occupied by the image reflected by the mirror.

The target apparatus may include as target elements a barcode or other indicia containing parameters describing the shape of the panoramic mirror; a series of marks for determining the center and the radius of the mirror, such as perpendicular marks drawn on radial lines outwards from the center of the mirror, marks drawn tangent to the edge of the mirror, or marks comprising a combination of perpendicular marks drawn on radial lines outwards from the center of the mirror and marks drawn tangent to the edge of the mirror such as the marks 278 shown in FIG. 28; a series of shaded blocks for correcting the luminance and the white balance of the image, such as the blocks 280 shown in FIG.

28; and focusing stars that can be placed at the appropriate distances from the camera's lens to match ideal focus lengths for the particular mirror being used, such as focus star 282 shown in FIG. 28.

In one embodiment, the image pixel data of a captured scene may be transferred to a server computer for processing in a client-server computer network, as disclosed in copending commonly owned U.S. patent application Ser. No. 10/081,433 filed Feb. 22, 2002, which is hereby incorporated by reference. Such processing may include, for example, converting the raw 2-dimensional array of pixels captured with the panoramic imaging device into an image suitable for viewing.

Figure 29:
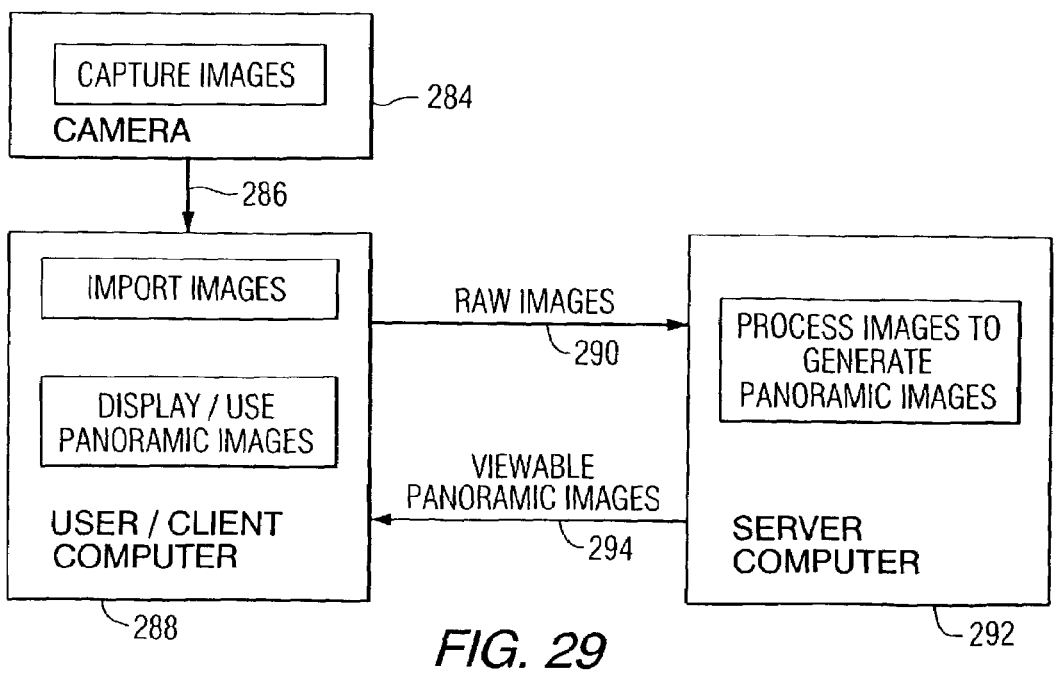
FIG. 29 is a functional block diagram that illustrates a particular example of a method of the invention.

FIG. 29 illustrates an embodiment of the invention for generating a panoramic image using client-server architecture. Specifically, a camera 284 is used for capturing a raw image. The raw image is then imported or transmitted, as illustrated at 286, from the camera to a user or client computer 288. The raw image may be downloaded from the camera 284 to the client computer 288 by a physical connection between the camera 284 and the client computer 288, by storing the captured image on a recording medium and then the client computer 288 reading the data from the recording medium, or by a wireless transmission from the camera 284 to the client computer 288.

Once the raw photographic image is resident on the client computer 288, the image is transmitted, as illustrated at 290, to a server computer 292. The images may be transmitted from the client computer 288 to the server computer 292 using, for example, an Internet connection therebetween, a wireless connection, a phone line, or other suitable networking medium. Furthermore, the images may be transmitted using various network protocols, including e-mail, File Transfer Protocol (FTP), Hypertext Transfer Protocol (HTTP), or other suitable networking protocols.

Once the raw images have been transmitted to the server computer 292 and are resident thereon, the server computer 292 may process the raw photographic image to obtain a viewable panoramic image. Such processing may be accomplished with the PhotoWarp software and/or the VideoWarp software in combination with a graphics hardware device, as previously described herein. The processing on the server computer may also include evaluating information obtained from a target apparatus and adjusting the raw image accordingly, as previously described herein.

Once the raw image has been processed to obtain a corresponding viewable panoramic image, the panoramic image may then be transmitted, as illustrated at 294, back to the client computer 288. The panoramic image may be transmitted from the server computer 292 to the client computer 288 in a similar manner as described herein for transmitting the raw images from the client computer 288 to the server computer 292. Once the panoramic images have been transmitted back to the client computer 288 and are resident thereon, a user may then display, view and/or use the processed panoramic images as desired. The client computer 288 may have installed thereon, software capable of viewing the panoramic images, such as Quicktime VR software available from Apple Computer, Inc.

Such a client server embodiment may include several variations. For example, a processed viewable panoramic image may be transmitted to an additional viewing computer or web server, rather than being transmitted back to the client computer 288. Alternatively, rather than transmitting the captured image from the camera to a user or client computer as illustrated in FIG. 29, the raw image may be transmitted directly to a server computer. This transmission may be performed by utilizing a camera, such as a digital camera, with the capability to transmit the images over a network using, for example, a wireless connection or a landline network. In another embodiment, the server computer may be capable of processing the raw image to obtain a viewable panoramic image, and may also be configured to allow the panoramic image to be viewed directly thereon or to place the processed panoramic image on a network for viewing by a remote computer. In addition, such a viewing/server computer may be configured to have the panoramic image embedded in a web page for viewing on a computer network.

In another embodiment of the invention, the ability to generate still panoramic images and/or panoramic video having multiple perspective views for different users at the same time is made available. This may be accomplished by rendering images with different viewing directions. Utilizing a client-server situation as described above, multiple users can elect to view different portions of the captured surrounding scene. Each user may independently alter the viewing perspective of the portion of the panoramic image they are viewing. The speed realized with the combination of the VideoWarp software and the graphics hardware device can provide panoramic video streams having multiple views and being requested by multiple users with almost no loss of performance and very little latency. In this embodiment, the video could be processed on the client side and then transferred to the server for viewing.

Although the present invention has been primarily described utilizing a compensated equi-angular mirror, it is to be understood that a parabolic shaped mirror, a hyperbolic shaped mirror, a spherical shaped mirror, or any other convex shaped mirror may be used, and these mirrors may or may not be combined with lenses of various types. Additionally, multiple mirrors may be combined in particular configurations, which may increase the resolution and/or available field of view of the resulting image or images. Such uses are within the scope of the present invention.

Although the panoramic imaging system of the present invention has been primarily described as using a computer system combined with software to process and produce images suitable for viewing, it is to be understood that a dedicated hardware system or other embedded computing device may also be used, and is within the scope of the present invention.

Whereas particular embodiments of this invention have been described above for purposes of illustration, it will be evident to those skilled in the art that numerous variations of the details of the present invention may be made without departing from the invention as defined in the appended claims.

What is claimed is:

1. A system for processing images, the system comprising:
   a mirror for reflecting an image of a scene;
   a mounting assembly for mounting the mirror on an axis, wherein the mirror includes a convex reflective surface defined by rotating around the axis: an equi-angular shape or a compensated equi-angular shape;
   a camera for capturing the image reflected by the minor;
   a digital conveder device for producing pixel data representative of the captured image; and
   means for radially linearly mapping the pixel data into a viewable image comprising:
      means for retrieving a source image file including the pixel data of the captured image;

a processor for creating a destination image file buffer, for mapping the pixel data of the captured image to the destination image file buffer, and for outputting pixel data from the destination image file buffer as a destination image file; and means for displaying a viewable image defined by the destination file, wherein the destination image file comprises one of: a cylindrical panoramic projection image file, a perspective panoramic projection image file, an equi-rectangular panoramic projection image file, and an equi-angular panoramic projection image file.

2. The system of claim 1, wherein the mirror has a compensated equi-angular shape described by the equation:

$$\frac{dr}{d\left(\theta+\frac{A}{\alpha}\right)} = r\cot\left(k\tan\left(\theta+\frac{A}{\alpha}\right)+\frac{\pi}{2}\right)$$

where θ is the angle that a light ray makes with the axis as it reflects off of a point on the surface of the mirror and into the lens of the camera, r is the length of a light ray between the lens of the camera and a point on the surface of the mirror, α is a constant defining the gain, and k is a constant defined by (−1−α)/2.

3. The system of claim 1, wherein the processor further serves as means for:
defining a first set of coordinates of pixels in the destination image file;
defining a second set of coordinates of pixels in the source image file;
identifying coordinates of the second set that correspond to coordinates of the first set; and
inserting pixel data for pixel locations corresponding to the second set of coordinates into pixel locations corresponding to the first set of coordinates.

4. The system of claim 1, wherein the processor further serves as means for interpolating the source image pixel data to produce pixel data for the destination image file buffer.

5. The system of claim 1, wherein the source image file comprises a panoramic projection image file.

6. The system of claim 3, wherein the first set of coordinates are spherical coordinates and the second set of coordinates are rectangular coordinates.

7. The system of claim 5, wherein the panoramic projection image file comprises a partial equi-rectangular projection.

8. The system of claim 5, wherein the panoramic projection image file comprises a modified partial equi-rectangular projection.

9. The system of claim 1, further comprising a target apparatus attached to the mirror.

10. The system of claim 1, further comprising:
means for transmitting the pixel data of the captured image to a server computer; and
means for processing the pixel data of the captured image on the server computer to obtain the viewable image.

11. A system for processing images, the system comprising:
a mirror for reflecting an image of a scene;
means for mounting the mirror on an axis, wherein the mirror includes a convex reflective surface defined by rotating around the axis: an equi-angular shape or a compensated equi-angular shape;
means for capturing the image reflected by the mirror;
means for producing pixel data representative of the captured image; and
means for radially linearly mapping the pixel data into a viewable image comprising:
means for retrieving a source image file including the pixel data of the captured image;
a processor for creating a destination image file buffer, for mapping the pixel data of the captured image to the destination image file buffer, and for outputting pixel data from the destination image file buffer as a destination image file; and
means for displaying a viewable image defined by the destination file, wherein the destination image file comprises one of: a cylindrical panoramic projection image file, a perspective panoramic projection image file, an equi-rectangular panoramic projection image file, and an equi-angular panoramic projection image file.

12. The system of claim 11, wherein the mirror has a compensated equi-angular shape described by the equation:

$$\frac{dr}{d\left(\theta+\frac{A}{\alpha}\right)} = r\cot\left(k\tan\left(\theta+\frac{A}{\alpha}\right)+\frac{\pi}{2}\right)$$

where θ is the angle that a light ray makes with the axis as it reflects off of a point on the surface of the mirror and into the lens of the camera, r is the length of a light ray between the lens of the camera and a point on the surface of the mirror, α is a constant defining the gain, and k is a constant defined by (−1−α)/2.

13. The system of claim 11, wherein the processor further serves as means for:
defining a first set of coordinates of pixels in the destination image file;
defining a second set of coordinates of pixels in the source image file;
identifying coordinates of the second set that correspond to coordinates of the first set; and
inserting pixel data for pixel locations corresponding to the second set of coordinates into pixel locations corresponding to the first set of coordinates.

14. The system of claim 11, wherein the processor further serves as means for interpolating the source image pixel data to produce pixel data for the destination image file buffer.

15. The system of claim 11, wherein the source image file comprises a panoramic projection image file.

16. The system of claim 13, wherein the first set of coordinates are spherical coordinates and the second set of coordinates are rectangular coordinates.

17. The system of claim 15, wherein the panoramic projection image file comprises a partial equi-rectangular projection.

18. The system of claim 15, wherein the panoramic projection image file comprises a modified partial equi-rectangular projection.

19. The system of claim 11, further comprising a target apparatus attached to the mirror.

20. The system of claim 11, further comprising:
means for transmitting the pixel data of the captured image to a server computer; and
means for processing the pixel data of the captured image on the server computer to obtain the viewable image.

21. A method of processing images, the method comprising the steps of:

providing a mirror for reflecting an image of a scene;
mounting the mirror on an axis, wherein the mirror includes a convex reflective surface defined by rotating around the axis: an equi-angular shape or a compensated equi-angular shape;
capturing the image reflected by the mirror;
producing pixel data representative of the captured image; and
radially linearly mapping the pixel data into a viewable image comprising:
retrieving a source image file including the pixel data of the captured image;
creating a destination image file buffer; mapping the pixel data from the source image file to the destination image file buffer; outputting pixel data from the destination image file buffer as a destination image file; and
displaying a viewable image defined by the destination file, wherein the destination image file comprises one of: a cylindrical panoramic projection image file, a perspective panoramic projection image file, an equi-rectangular panoramic projection image file, and an equi-angular panoramic protection image file.

22. The method of claim 21, wherein the mirror has a compensated equi-angular shape described by the equation:

$$\frac{dr}{d\left(\theta+\frac{A}{\alpha}\right)} = r\cot\left(k\tan\left(\theta+\frac{A}{\alpha}\right)+\frac{\pi}{2}\right)$$

where θ is the angle that a light ray makes with the axis as it reflects off of a point on the surface of the mirror and into the lens of the camera, r is the length of a light ray between the lens of the camera and a point on the surface of the mirror, α is a constant defining the gain, and k is a constant defined by (−1−α)/2.

23. The method of claim 21, wherein the step of mapping pixel data from the source image file to the destination image file buffer comprises the steps of:
defining a first set of coordinates of pixels in the destination image file;
defining a second set of coordinates of pixels in the source image file;
identifying coordinates of the second set that correspond to coordinates of the first set;
inserting pixel data for pixel locations corresponding the second set of coordinates into pixel locations corresponding to the first set of coordinates.

24. The method of claim 21, wherein the step of mapping the pixel data from the source image file to the destination image file buffer includes the step of:
interpolating the source image pixel data to produce pixel data for the destination image file buffer.

25. The method of claim 21, wherein the source image file comprises a panoramic projection image file.

26. The method of claim 23, wherein the first set of coordinates are spherical coordinates and the second set of coordinates are rectangular coordinates.

27. The method of claim 25, wherein the panoramic projection image file comprises a partial equi-rectangular projection.

28. The method of claim 25, wherein the panoramic projection image file comprises a modified partial equi-rectangular projection.

29. The method of claim 21, further comprising the steps of:
transmitting the pixel data of the captured image to a server computer; and
processing the pixel data of the captured image on the server computer to obtain the viewable image.

30. A system for processing images, the system comprising:
a minor for reflecting an image of a scene;
means for mounting the mirror on an axis, wherein the mirror includes a convex reflective surface defined by rotating around the axis: an equi-angular shape or a compensated equi-angular shape;
means for capturing the image reflected by the mirror;
means for producing pixel data representative of the captured image; and
means for radially linearly mapping the pixel data into a viewable image comprising:
means for retrieving a source image file including the pixel data of the captured image;
a processor for creating a destination image file buffer, for mapping the pixel data of the captured image to the destination image file buffer, and for outputting pixel data from the destination image file buffer as a destination image file, wherein the processor further serves as means for interpolating the source image pixel data to produce pixel data for the destination image file buffer; and
means for displaying a viewable image defined by the destination file.

31. A method of processing images, the method comprising the steps of:
providing a minor for reflecting an image of a scene;
mounting the minor on an axis, wherein the mirror includes a convex reflective surface defined by rotating around the axis: an equi-angular shape or a compensated equi-angular shape;
capturing the image reflected by the minor;
producing pixel data representative of the captured image; and
radially linearly mapping the pixel data into a viewable image comprising:
retrieving a source image file including the pixel data of the captured image, wherein the source image file comprises a panoramic projection image file;
creating a destination image file buffer; mapping the pixel data from the source image file to the destination image file buffer; outputting pixel data from the destination image file buffer as a destination image file; and
displaying a viewable image defined by the destination file.

* * * * *

UNITED STATES PATENT AND TRADEMARK OFFICE
CERTIFICATE OF CORRECTION

PATENT NO. : 7,123,777 B2
APPLICATION NO. : 10/256743
DATED : October 17, 2006
INVENTOR(S) : Michael Rondinelli, Herman Herman and Sanjiv Singh It is certified that error appears in the above-identified patent and that said Letters Patent is hereby corrected as shown below:

Background Information
Column 2, Line 21
"...Hernan,..." should read --Herman,...--

Detailed Description of the Invention
Column 13, Line 5
"...$D_R.D_M$..." should read --...$D_R:D_M$...--

Column 15, Line 12
"...a Pano1mage. The Pano1mage..." should read --...a PanoImage. The PanoImage...--

Claims
Column 28, Line 61 (Claim 1)
"...the minor;..." should read --...the mirror;...--

Column 28, Line 62 (Claim 1)
"...digital conveder..." should read --...digital converter...--

Column 29, Line 13 (Claim 2)
"...the minor..." should read --...the mirror...--

Column 29, Line 25 (Claim 2)
"...the minor..." should read --...the mirror...--

Column 31, Line 23 (Claim 21)
"...protection image..." should read --...projection image...--

Column 32, Line 15 (Claim 30)
"...a minor..." should read --...a mirror...--

Column 32, Line 39 (Claim 31)
"...a minor..." should read --...a mirror...--

UNITED STATES PATENT AND TRADEMARK OFFICE
CERTIFICATE OF CORRECTION

PATENT NO. : 7,123,777 B2
APPLICATION NO. : 10/256743
DATED : October 17, 2006
INVENTOR(S) : Michael Rondinelli, Herman Herman and Sanjiv Singh It is certified that error appears in the above-identified patent and that said Letters Patent is hereby corrected as shown below:

Claims (cont'd)
Column 32, Line 44 (Claim 31)
"...the minor..." should read --...the mirror...--

Signed and Sealed this

Third Day of July, 2007

JON W. DUDAS
*Director of the United States Patent and Trademark Office*